(12) United States Patent
Kumazawa et al.

(10) Patent No.: US 12,040,620 B2
(45) Date of Patent: Jul. 16, 2024

(54) RENEWAL ENERGY HYDROGEN SYSTEM

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Toshimitsu Kumazawa, Kawasaki (JP); Akihiro Itakura, Kawasaki (JP); Toru Yano, Shinagawa (JP); Takahiko Abe, Ageo (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 490 days.

(21) Appl. No.: 17/470,936

(22) Filed: Sep. 9, 2021

(65) Prior Publication Data

US 2022/0302708 A1    Sep. 22, 2022

(30) Foreign Application Priority Data

Mar. 17, 2021    (JP) .................. 2021-044050

(51) Int. Cl.
*H02J 3/38* (2006.01)
*G05B 15/02* (2006.01)
(Continued)

(52) U.S. Cl.
CPC .............. *H02J 3/381* (2013.01); *G05B 15/02* (2013.01); *H01M 8/04992* (2013.01);
(Continued)

(58) Field of Classification Search
None
See application file for complete search history.

(56) References Cited

U.S. PATENT DOCUMENTS 9,793,723 B2 * 10/2017 Tomita ................. H02J 3/32
2004/0126641 A1    7/2004 Pearson et al.
(Continued)

FOREIGN PATENT DOCUMENTS

JP    2003-134665 A    5/2003
JP    2004-120903 A    4/2004
(Continued)

OTHER PUBLICATIONS

Becherifa et al., "Hydrogen Energy Storage: New Techno-Economic Emergence Solution Analysis", 2015, Energy Procedia 74 ( 2015 ) 371-380. (Year: 2015).*

(Continued)

*Primary Examiner* — Mohammad Ali
*Assistant Examiner* — Kelvin Booker
(74) *Attorney, Agent, or Firm* — Oblon, McClelland, Maier & Neustadt, L.L.P.

(57) ABSTRACT

According to one embodiment, an information processing apparatus includes: receiving circuitry and the controlling circuitry. The receiving circuitry receives operation data of an energy system being capable of inputting and outputting power to and from a power line to which a power system and a load are connected, and the energy system including a hydrogen production apparatus producing hydrogen, a first hydrogen accumulation apparatus accumulating the hydrogen, a first power generation apparatus generating power using the hydrogen accumulated in the first hydrogen accumulation apparatus, and a storage battery capable of charging and discharging. The controlling circuitry determines a process to be preferentially executed among at least two of processes of generating power in the first power generation apparatus, producing hydrogen in the hydrogen to be accumulated apparatus, charging the storage battery, discharging (Continued)

the storage battery, transmitting power to the power system, and receiving power from the power system.

13 Claims, 14 Drawing Sheets

(51) Int. Cl.
*H01M 8/04* (2016.01)
*H01M 8/04992* (2016.01)
*H01M 8/06* (2016.01)
*H01M 8/0606* (2016.01)
*H01M 10/44* (2006.01)
*H01M 16/00* (2006.01)
*H02J 7/00* (2006.01)

(52) U.S. Cl.
CPC ......... *H01M 8/0606* (2013.01); *H01M 10/44* (2013.01); *H01M 16/006* (2013.01); *H02J 7/0069* (2020.01); *H02J 2300/24* (2020.01)

(56) References Cited

U.S. PATENT DOCUMENTS

| | | | |
|---|---|---|---|
| 2006/0260672 A1* | 11/2006 | Niederer | H02S 10/12 136/251 |
| 2009/0048716 A1 | 2/2009 | Marhoefer | |
| 2009/0076661 A1* | 3/2009 | Pearson | H01M 16/006 307/46 |
| 2015/0229138 A1* | 8/2015 | Nakamura | G05B 15/02 700/297 |
| 2019/0386491 A1 | 12/2019 | Ito et al. | |

FOREIGN PATENT DOCUMENTS

| | | | | |
|---|---|---|---|---|
| JP | 2005033961 A1 * | 2/2005 | | H02J 1/10 |
| JP | 2006-340539 A | 12/2006 | | |
| JP | 2007-68337 A | 3/2007 | | |
| JP | 2009-71889 A | 4/2009 | | |
| JP | 2014033592 A1 * | 2/2014 | | G05B 15/02 |
| JP | 2016-208694 A | 12/2016 | | |
| JP | 6114777 B2 | 4/2017 | | |
| JP | 2019221126 A1 * | 12/2019 | | H02J 1/10 |
| WO | WO 03/032429 A3 | 4/2003 | | |
| WO | WO 2017/017734 A1 | 2/2017 | | |
| WO | WO-2019182038 A1 * | 9/2019 | | H02J 3/14 |
| WO | WO 2020/166571 A1 | 8/2020 | | |
| WO | WO 2020/188266 A1 | 9/2020 | | |

OTHER PUBLICATIONS

Carapellucci et al., "Modeling and optimization of an energy generation island based on renewable technologies and hydrogen storage systems", Jul. 2011, international journal of hydrogen energy 37 (2012)2081e2093. (Year: 2011).*

Kelouwani et al., "Model for energy conversion in renewable energy system with hydrogen storage", Jul. 2004, Journal of Power Sources 140 (2005) 392-399. (Year: 2004).*

* cited by examiner

RENEWAL ENERGY HYDROGEN SYSTEM

CROSS REFERENCE TO RELATED APPLICATIONS

This application is based upon and claims the benefit of priority from the prior Japanese Patent Application No. 2021-044050, filed on Mar. 17, 2021, the entire contents of which are incorporated herein by reference.

FIELD

Embodiments described herein relate to an information processing apparatus, an information processing method, a non-transitory computer readable medium, and an information processing system.

BACKGROUND

In recent years, a renewable energy hydrogen system has attracted attention as an energy system which utilizes renewable energy as measures for reducing $CO_2$ or measures for a business continuity plan (BCP) at the time of disaster. As a control method of the renewable energy hydrogen system, typically, a method (hysteresis band method) in which control is performed so that renewable energy is self-consumed as much as possible by combining the renewable energy hydrogen system with a storage battery is used. As a specific example, a method in which a hydrogen storage apparatus and a power generation apparatus within a consumer are controlled in view of electricity cost is known.

It is considered that operation in a long-term perspective will increase for the purpose of improving a utilization rate of renewable energy and achieving net zero of supply of power as economic rationality is more desired in the renewable energy hydrogen system.

DETAILED DESCRIPTION

Figure 1:
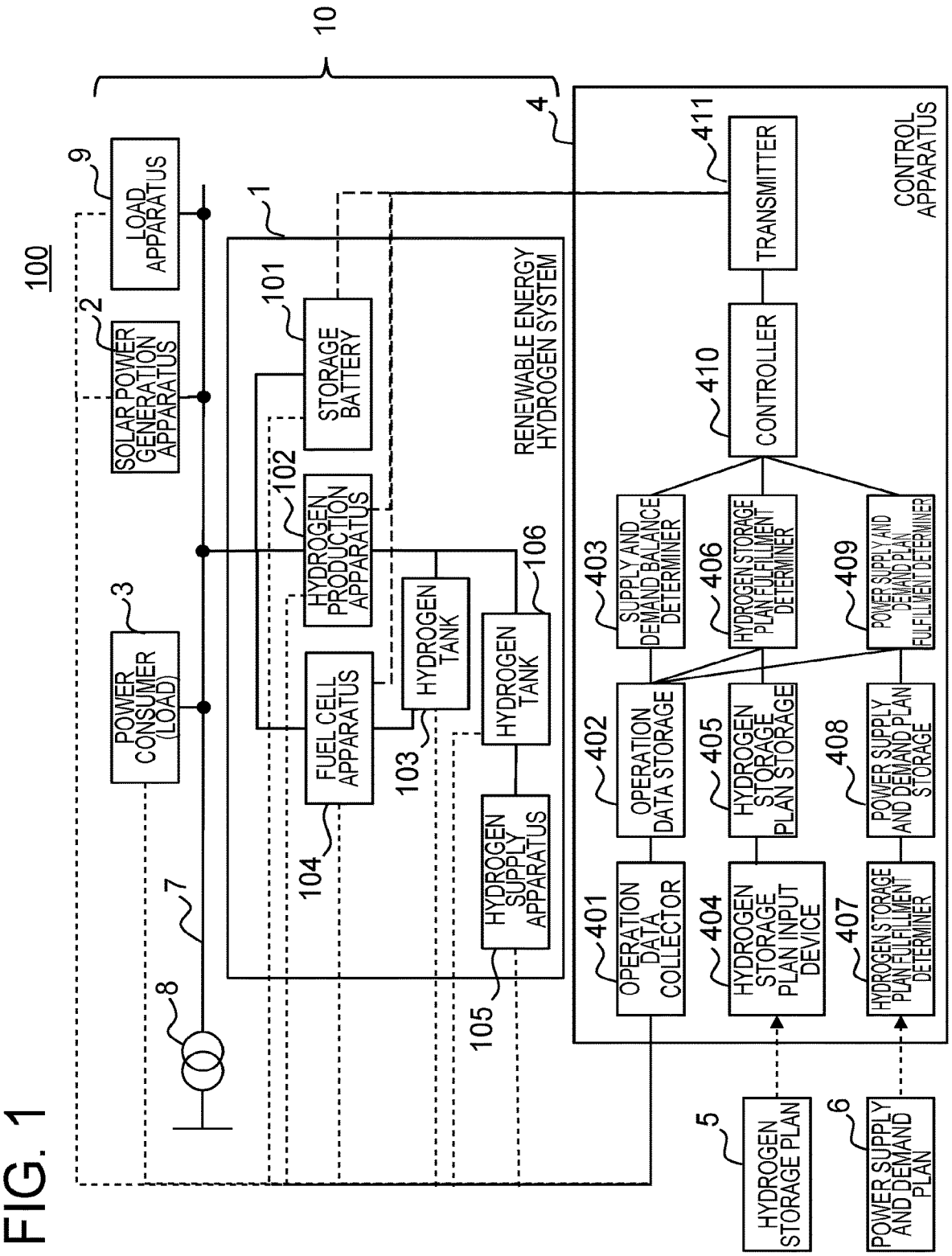
FIG. 1 is a block diagram of an information processing system according to a first embodiment.

According to one embodiment, an information processing apparatus includes: receiving circuitry and controlling circuitry.

The receiving circuitry is configured to receive operation data of an energy system, the energy system being capable of inputting and outputting power to and from a power line to which a power system and a load are connected. The energy system includes a hydrogen production apparatus producing hydrogen, a first hydrogen accumulation apparatus accumulating the hydrogen, a first power generation apparatus generating power using the hydrogen accumulated in the first hydrogen accumulation apparatus, and a storage battery capable of charging and discharging power.

The controlling circuitry is configured to determine, on a basis of the operation data, a process to be preferentially executed among at least two of processes including: a process of generating power in the first power generation apparatus, a process of producing hydrogen in the hydrogen production apparatus, a process of charging the storage battery, a process of discharging the storage battery, a process of transmitting power to the power system and a process of receiving power from the power system.

Embodiments of the present invention will be described below with reference to the drawings. In the respective drawings, the same reference numerals will be assigned to components having the same or equivalent functions and detailed description will be omitted as appropriate except expanded or changed processing.

First Embodiment

FIG. 1 is a block diagram illustrating an entire configuration of an information processing system 100 as an information processing system according to a first embodiment. The information processing system 100 includes an energy system 10, and a control apparatus 4 which controls the energy system 10. The energy system 10 includes a renewable energy hydrogen system 1, a solar power generation apparatus 2 (second power generation apparatus), a power consumer 3 (load), and a load apparatus 9.

The renewable energy hydrogen system 1 is connected (coupled) to a power line 7 which can receive and transmit (reverse power flow) power from and to a distribution system 8 (electric system). Reception of power from the distribution system 8 corresponds to power purchase, and transmission of power to the distribution system 8 corresponds to power selling.

In addition to the renewable energy hydrogen system 1, the solar power generation apparatus 2, the power consumer 3, the load apparatus 9, or the like, are connected (coupled) to the power line 7. The power consumer 3 corresponds to an example of a load which consumes power. The load apparatus 9 is an arbitrary load other than the power consumer 3. The load apparatus 9 may be, for example, an apparatus such as a motor, an arbitrary power consumption apparatus within a facility, or other apparatuses. The solar power generation apparatus 2 converts energy of sunlight into power and outputs the converted power to the power line 7. While one solar power generation apparatus 2, one power consumer 3 and one load apparatus 9 are illustrated in the example in FIG. 1, there may be a plurality of solar power generation apparatuses 2, a plurality of power consumers 3 and a plurality of load apparatuses 9. The renewable energy hydrogen system 1 includes a storage battery 101, a hydrogen production apparatus 102, a hydrogen tank 103 (first hydrogen accumulation apparatus), a fuel cell apparatus 104 (first power generation apparatus), a hydrogen supply apparatus 105, and a hydrogen tank 106 (second hydrogen accumulation apparatus).

The storage battery 101 charges and discharges power in accordance with control information provided from the control apparatus 4. Charging and discharging include at least one of charging and discharging. In a case of charging, the storage battery 101 charges surplus power. The surplus power includes power which is not consumed at the power consumer 3 and the load apparatus 9 and left among power generated at the solar power generation apparatus 2 and power received from the distribution system 8 as an example. In a case of discharging, the storage battery 101 discharges power accumulated inside the power line 7. The discharged power is consumed at the power consumer 3 (load) or the load apparatus 9 or transmitted to the distribution system 8.

The hydrogen production apparatus 102 produces hydrogen using power supplied from the power line 7 (which may include power received from the distribution system 8) in accordance with the control information provided from the control apparatus 4. The hydrogen production apparatus 102 transmits the produced hydrogen to at least one of the hydrogen tank 103 and the hydrogen tank 106. The hydrogen production apparatus 102 produces hydrogen using power, for example, through an electrolytic method typified by alkaline water electrolysis.

The hydrogen tank 103 receives hydrogen produced at the hydrogen production apparatus 102 and stores the hydrogen inside. The hydrogen tank 106 receives hydrogen produced at the hydrogen production apparatus 102 and stores the hydrogen inside. The hydrogen tank 103 and the hydrogen tank 106 are high pressure hydrogen gas containers, hydrogen absorbing alloys, or the like. The hydrogen tank 103 has a function of providing the stored hydrogen to the fuel cell apparatus 104 and a function of measuring an amount of the stored hydrogen. The hydrogen tank 106 has a function of providing the stored hydrogen to the hydrogen supply apparatus 105 and a function of measuring an amount of the stored hydrogen.

The fuel cell apparatus 104 generates power using the hydrogen supplied from the hydrogen tank 103 and supplies the generated power to the power line 7. The fuel cell apparatus 104 is, for example, a solid polymer fuel cell, a solid oxide fuel cell, or the like. The fuel cell apparatus 104 is not limited to the fuel cell as long as the fuel cell apparatus has a function of generating power from hydrogen.

The hydrogen supply apparatus 105 has a function of receiving the hydrogen stored in the hydrogen tank 106 and supplying the received hydrogen to an external apparatus (first apparatus). The external apparatus is, for example, a hydrogen fuel cell vehicle (FCV). In this case, hydrogen can be used as a fuel of the fuel cell vehicle.

The control apparatus 4 of the renewable energy hydrogen system 1 includes an operation data collector 401, an operation data storage 402, a supply and demand balance determiner 403, a hydrogen storage plan input device 404, a hydrogen storage plan storage 405, a hydrogen storage plan fulfillment determiner 406, a power supply and demand plan input device 407, a power supply and demand plan storage 408, a power supply and demand plan fulfillment determiner 409, a controller 410 and a transmitter 411. The control apparatus 4 can perform communication with the renewable energy hydrogen system 1 or the energy system 10 via a communication network. The communication network may be either a wireless network or a wired network. The communication network may be either a wide area network such as the Internet, or a local area network such as a wireless local area network (LAN) and Ethernet.

The operation data collector 401 acquires operation data of the energy system 10. The operation data collector 401 corresponds to receiving circuitry or a receiver, which receives or collects the operation data. The operation data of the energy system 10 includes part or all of operation data of the storage battery 101, operation data of the hydrogen production apparatus 102, operation data of the fuel cell apparatus 104, operation data of the hydrogen tank 103, operation data of the hydrogen tank 106, operation data of the hydrogen supply apparatus 105, operation data of the solar power generation apparatus 2, operation data of the power consumer 3, operation data of the load apparatus 9, and operation data of the distribution system 8 as an example. The operation data may be acquired at regular intervals or at a timing at which operation of respective components (101 to 106) occurs. Alternatively, the operation data of the respective components may be acquired by transmitting an acquisition request of the operation data to the energy system 10 from the operation data collector 401.

The operation data of the storage battery 101 includes transition of the amount of power charged inside, history of charging and discharging (such as time and an amount of charged and discharged power), or the like, as an example. The operation data of the hydrogen production apparatus 102 includes an amount of power used for hydrogen production, history of production of hydrogen (such as time and an amount of produced hydrogen), or the like, as an example. The operation data of the fuel cell apparatus 104 includes history of power generation (such as time and an amount of generated power), or the like, as an example, and may further include an amount of hydrogen used for power generation. The operation data of the hydrogen tank 103 includes history of an amount of accumulated hydrogen (such as time and an amount of hydrogen), or the like, as an example. The operation data of the hydrogen tank 106 includes history of an amount of accumulated hydrogen (such as time and an amount of hydrogen), or the like, as an example. The operation data of the hydrogen supply apparatus 105 includes history of hydrogen provided to an external apparatus (such as time and an amount of hydrogen), or the like, as an example. The operation data of the solar power generation apparatus 2 includes history of power generation (such as time and an amount of generated power), or the like, as an example. The operation data of the power consumer 3 includes history of power consumption (such as time and an amount of power consumption), or the like, as an example. The operation data of the distribution system 8 includes history of an amount of power transmitted and received to and from the distribution system 8 (such as time and an amount of transmitted and received power), or the like.

The operation data storage 402 stores the operation data acquired by the operation data collector 401 inside. The operation data storage 402 may be an arbitrary storage apparatus such as a memory, a hard disk, an optical recording medium and a magnetic recording medium. The memory may be either a non-volatile memory or a volatile memory.

The supply and demand balance determiner 403 compares generated power (P_PV) generated by the solar power generation apparatus 2 and consumed power (P_LOAD) consumed by the load such as the power consumer 3 and the load apparatus 9 and determines whether the generated power (P_PV) is equal to or greater than the consumed power (P_LOAD). In other words, the supply and demand balance determiner 403 determines whether or not a value obtained by subtracting the consumed power (P_LOAD) from the generated power (P_PV) is equal to or greater than 0. The supply and demand balance determiner 403 provides a determination result to the controller 410.

The hydrogen storage plan input device 404 receives a plan (a hydrogen storage plan 5 or a second plan) regarding an amount of hydrogen to be accumulated in the hydrogen tank 106 from an input apparatus (not illustrated) and provides the hydrogen storage plan 5 to the hydrogen storage plan storage 405. The hydrogen storage plan storage 405 stores the hydrogen storage plan 5 inside. The hydrogen storage plan storage 405 is an arbitrary storage apparatus such as a memory, a hard disk, an optical recording medium and a magnetic recording medium. The memory may be either a non-volatile memory or a volatile memory. The input apparatus may be an operation terminal to be operated by an operator of the control apparatus 4 or a storage apparatus or a server on a communication network.

Figure 2:
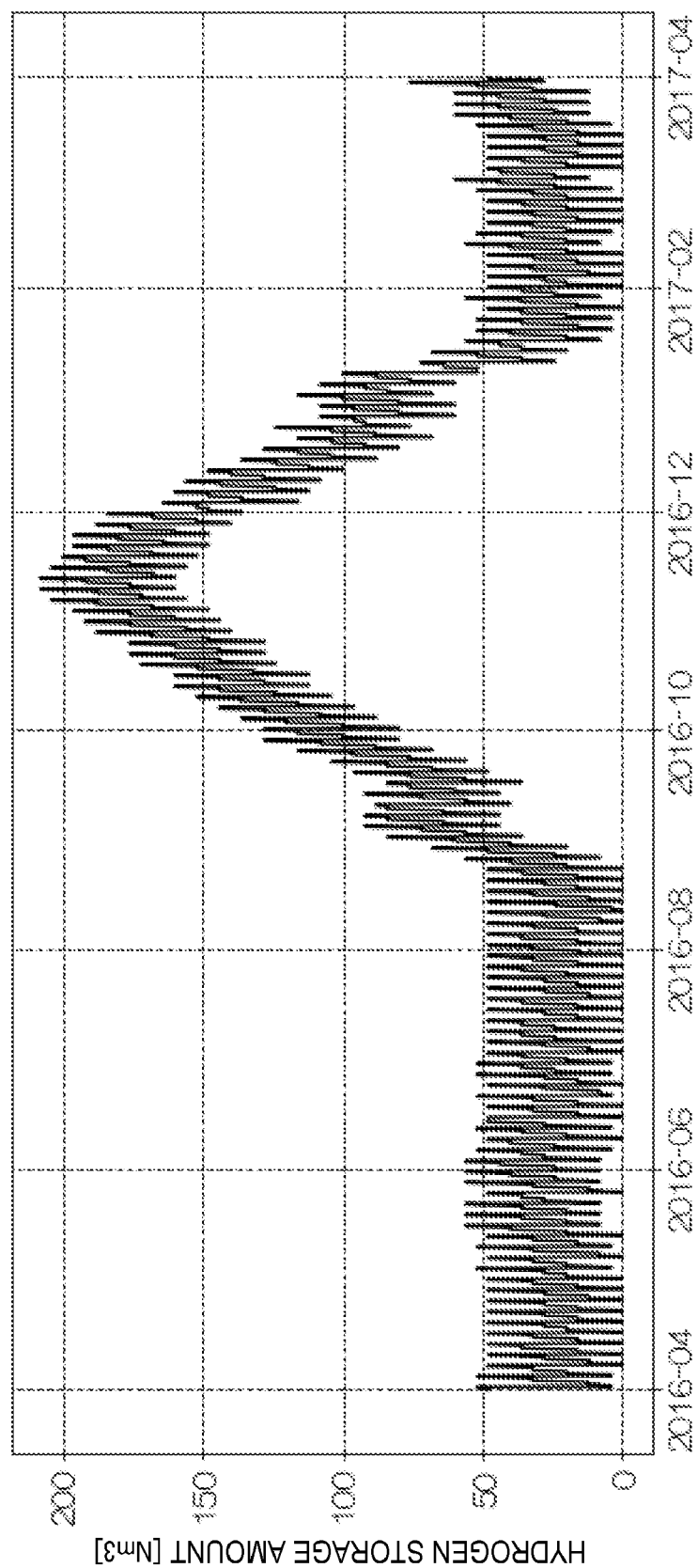
FIG. 2 is a view illustrating an example of a hydrogen storage plan.

FIG. 2 illustrates an example of the hydrogen storage plan 5. The hydrogen storage plan 5 indicates a storage plan of the hydrogen tank 106 over a long period such as a year. This example indicates an example of a plan in a case where the hydrogen supply apparatus 105 supplies hydrogen in the hydrogen tank 106 to a fuel cell vehicle. FIG. 2 indicates time on a horizontal axis and indicates an amount of stored hydrogen on a vertical axis. A graph indicates an amount of stored hydrogen.

The hydrogen storage plan fulfillment determiner 406 determines whether the amount of hydrogen stored in the hydrogen tank 106 fulfills the hydrogen storage plan 5 at time at which determination is to be performed. The time at which determination is to be performed may be current time (for example, latest time at regular intervals) or time in the past or in the future. In a case of time in the future, the amount of stored hydrogen at time in the future may be predicted using a learned model, or the like. The hydrogen storage plan fulfillment determiner 406 determines whether or not the amount of hydrogen stored in the hydrogen tank 103 at time at which determination is to be performed is equal to or greater than a planned value (threshold) at time at which determination is to be performed in the hydrogen storage plan 5. The hydrogen storage plan fulfillment determiner 406 determines that the amount of hydrogen stored in the hydrogen tank 103 fulfills the hydrogen storage plan 5 in a case where the amount of stored hydrogen is equal to or greater than the planned value and determines that the amount of hydrogen stored in the hydrogen tank 103 does not fulfill the hydrogen storage plan 5 in a case where the amount of stored hydrogen is less than the planned value. The hydrogen storage plan fulfillment determiner 406 provides a determination result to the controller 410.

The power supply and demand plan input device 407 receives a plan (a power supply and demand plan 6 or a first plan) regarding an amount of power to be transmitted and received to and from the distribution system 8 from an input apparatus (not illustrated) and provides the power supply and demand plan 6 to the power supply and demand plan storage 408. The power supply and demand plan storage 408 stores the power supply and demand plan 6 inside. The power supply and demand plan storage 408 is an arbitrary storage apparatus such as a memory, a hard disk, an optical recording medium and a magnetic recording medium. The memory may be either a non-volatile memory or a volatile memory. The input apparatus may be an operation terminal to be operated by the operator of the control apparatus 4 or a storage apparatus or a server on a communication network.

Figure 3:
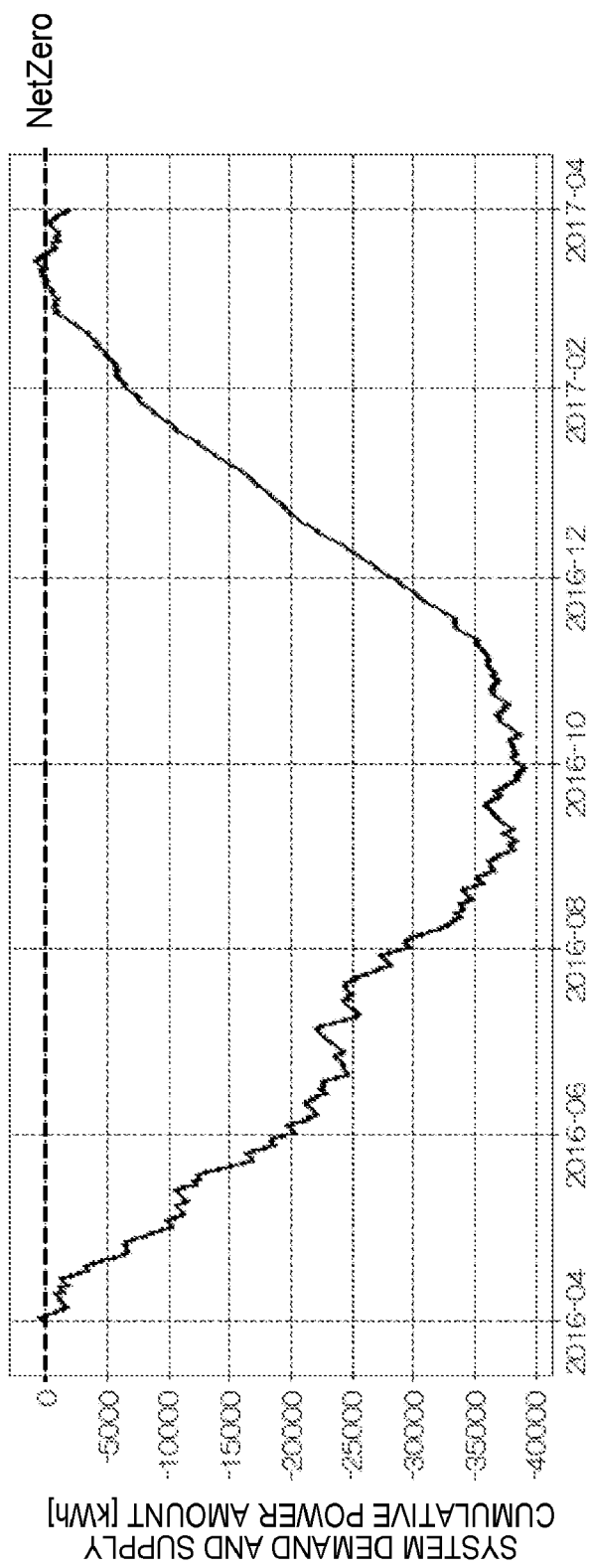
FIG. 3 is a view illustrating a power supply and demand plan.

FIG. 3 illustrates an example of the power supply and demand plan 6. The power supply and demand plan 6 indicates a plan of a cumulative amount of power over a long period such as a year. FIG. 3 indicates time on a horizontal axis and indicates a cumulative amount of power transmitted and received to and from the distribution system 8 on a vertical axis. The cumulative amount of power being finally equal to or less than 0 means that power of the load such as the power consumer 3 and the load apparatus 9 can be secured with power generated at the energy system 10 without power being substantially received from the distribution system 8 (net zero).

The power supply and demand plan fulfillment determiner 409 determines whether the cumulative amount of power transmitted and received to and from the distribution system 8 at time at which determination is to be performed fulfills the power supply and demand plan 6. The time at which determination is to be performed may be current time (for example, latest time at regular intervals) or time in the past or in the future. In a case of time in the future, the cumulative amount of power at time in the future may be predicted using a learned model, or the like. The power supply and demand plan fulfillment determiner 409 determines whether or not the cumulative amount of power at time at which determination is to be performed is equal to or greater than a planned value (threshold) at time at which determination is to be performed in the power supply and demand plan 6. The power supply and demand plan fulfillment determiner 409 determines that the cumulative amount of power fulfills the power supply and demand plan 6 in a case where the cumulative amount of power is equal to or less than the planned value and determines that the cumulative amount of power does not fulfill the power supply and demand plan 6 in a case where the cumulative amount of power exceeds the planned value. The power supply and demand plan fulfillment determiner 409 provides a determination result to the controller 410.

The controller 410 acquires information indicating the determination results from the supply and demand balance determiner 403, the hydrogen storage plan fulfillment determiner 406 and the power supply and demand plan fulfillment determiner 409 and generates control information of the energy system 10 or control information of the renewable energy hydrogen system 1 on the basis of the acquired information. For example, the controller 410 determines a process to be preferentially executed among at least two processes including: power generation of the fuel cell apparatus 104, production of hydrogen to be accumulated in the hydrogen tank 106, production of hydrogen to be accumulated in the hydrogen tank 103, charging of the storage battery 101, discharging of the storage battery 101, selling power to the distribution system 8 (power system), purchasing power from the distribution system 8, and the like. In this event, the controller 410 may determine priority of at least two processes and determine which process is to be executed on the basis of the determined priority. The controller 410 generates control information for causing a corresponding component in the energy system 10 or the renewable energy hydrogen system 1 to execute the determined process. For example, in a case where it is determined to cause the hydrogen production apparatus 102 to produce hydrogen to be accumulated in the hydrogen tank 106, the controller 410 generates control information which instructs the hydrogen production apparatus 102 to produce a fixed output amount of hydrogen and accumulate the hydrogen in the hydrogen tank 106. The controller 410 provides the generated control information to the transmitter 411.

The transmitter 411 transmits the control information to the renewable energy hydrogen system 1. The renewable energy hydrogen system 1 or the energy system 10 includes a receiver which receives the control information and transmits the received control information to corresponding components (such as the storage battery 101, the hydrogen production apparatus 102, the fuel cell apparatus 104 and the hydrogen supply apparatus 105). There is also a case where the transmitter 411 transmits the control information to the load apparatus 9 or the power consumer 3.

An operation example of the control apparatus 4 will be described in detail below using FIG. 4 to FIG. 8.

Figure 4:
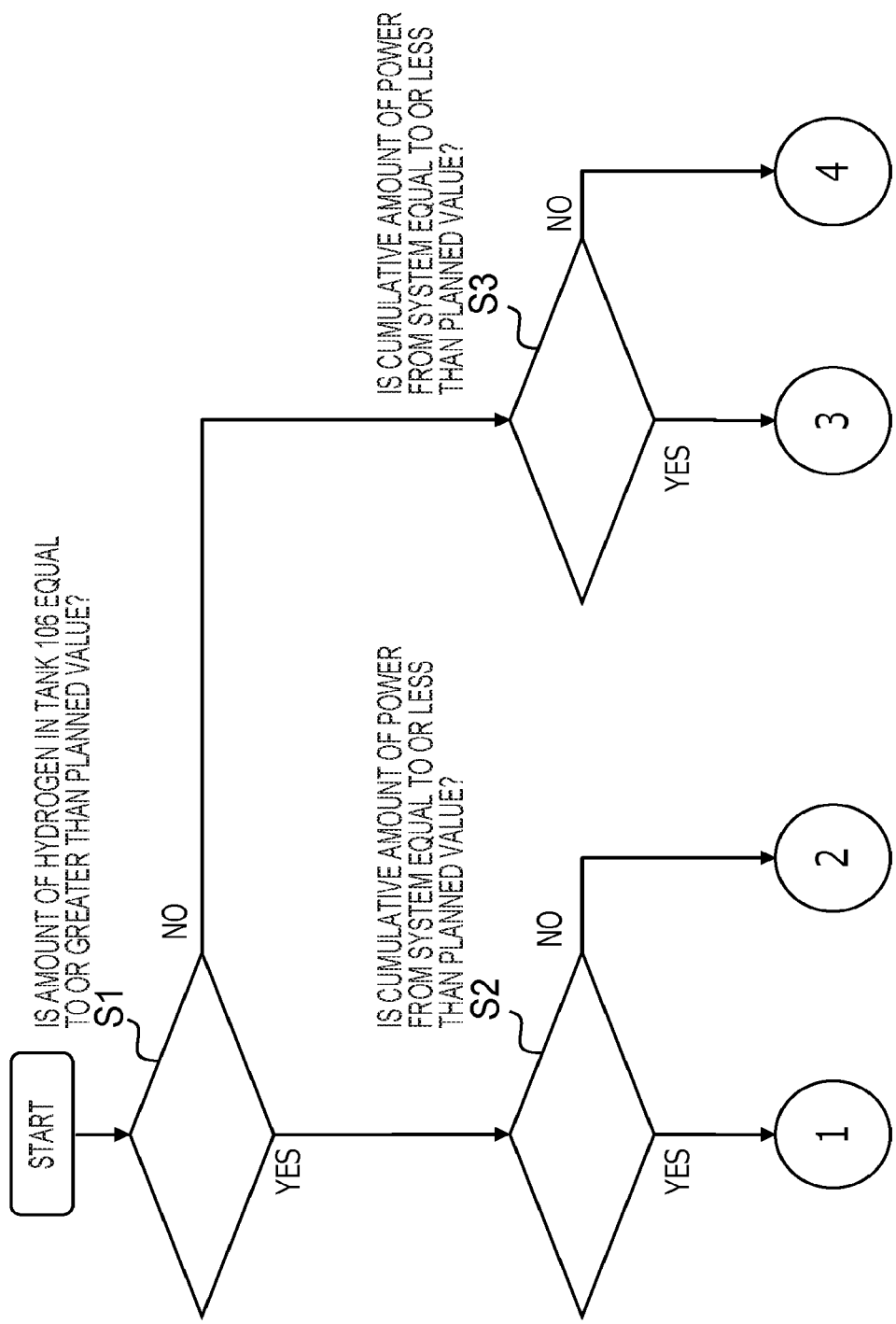
FIG. 4 is a flowchart of plan fulfillment determination processing of the information processing system according to the first embodiment.

FIG. 4 is a flowchart of an example of operation of the control apparatus 4. The flowchart in FIG. 4 is executed at an arbitrary timing or at regular intervals (for example, at intervals of 10 minutes, 30 minutes, one hour, several hours or one day).

In step S1, the hydrogen storage plan fulfillment determiner 406 determines whether the hydrogen storage plan 5 is fulfilled on the basis of the amount of hydrogen stored in the hydrogen tank 106. In other words, the hydrogen storage plan fulfillment determiner 406 determines whether or not the amount of hydrogen stored in the hydrogen tank 106 is equal to or greater than a planned value.

In a case where the hydrogen storage plan 5 is fulfilled (S1: Yes), the power supply and demand plan fulfillment determiner 409 determines whether a cumulative amount of power transmitted and received to and from the distribution system 8 (cumulative amount of power) fulfills the power supply and demand plan 6 (S2). In other words, the power supply and demand plan fulfillment determiner 409 determines whether or not the cumulative amount of power is equal to or less than the planned value. In a case where the cumulative amount of power is equal to or less than the planned value (S2: Yes), the processing proceeds to a flowchart in FIG. 5. In a case where the cumulative amount of power is greater than the planned value (S2: No), the processing proceeds to a flowchart in FIG. 6.

In a case where the hydrogen storage plan 5 is not fulfilled (S1: No), the power supply and demand plan fulfillment determiner 409 determines whether the cumulative amount of power fulfills the power supply and demand plan 6, that is, whether the cumulative amount of power is equal to or less than the planned value (S3). In a case where the cumulative amount of power is equal to or less than the planned value (S3: Yes), the processing proceeds to a flowchart in FIG. 7. In a case where the cumulative amount of power is greater than the planned value (S3: No), the processing proceeds to a flowchart in FIG. 8. Processing in the flowchart from FIG. 5 to FIG. 8 may be repeatedly performed at intervals (for example, at intervals of one minute) shorter than the time interval in the flowchart in FIG. 4. In this case, the processing in the flowchart in one of FIG. 5 to FIG. 8 determined in the processing in the flowchart in FIG. 4 is performed a plurality of times every time determination in the flowchart in FIG. 4 is performed once.

[Case where Both Hydrogen Storage Plan 5 and Power Supply and Demand Plan 6 are Fulfilled]

Figure 5:
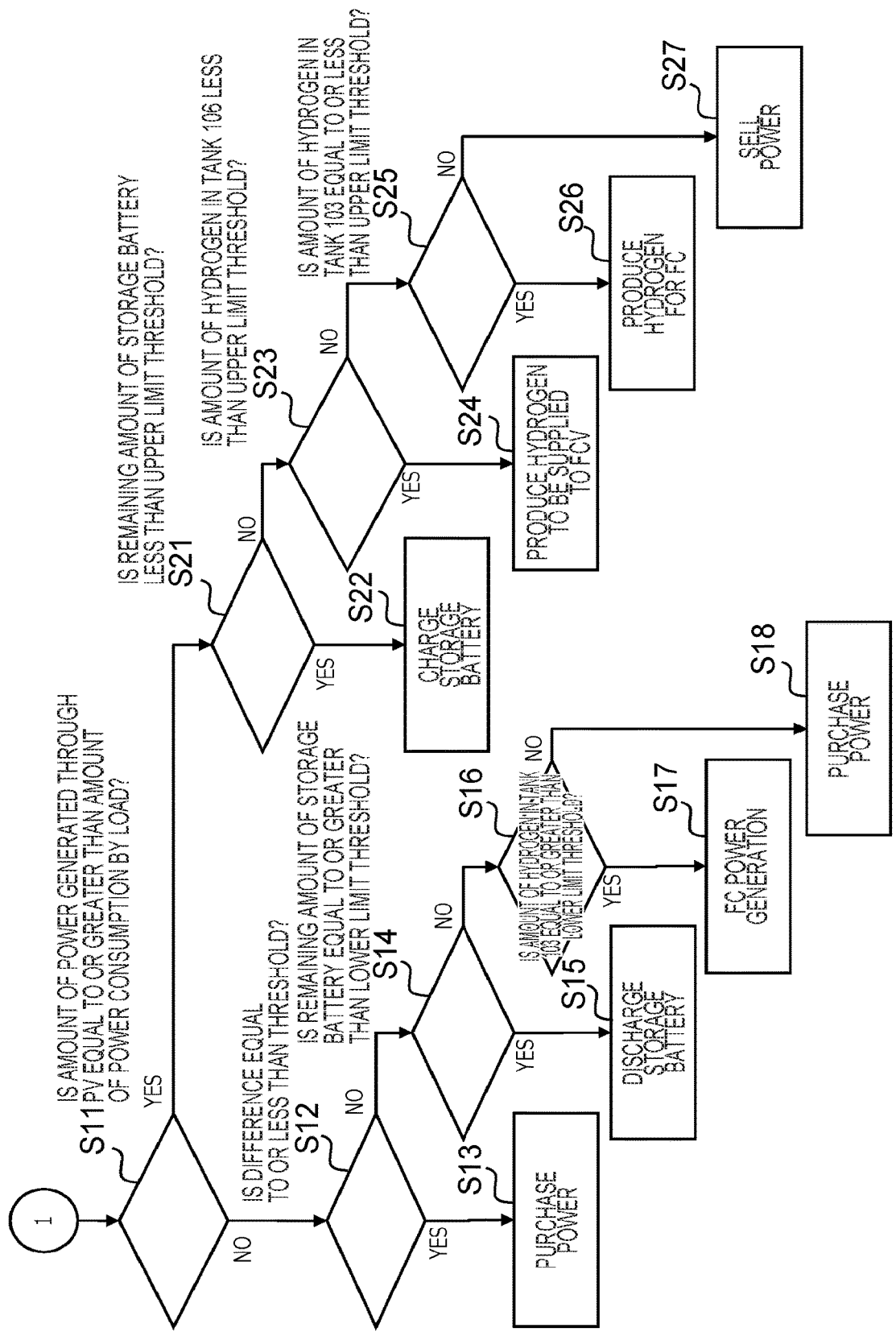
FIG. 5 is a flowchart for determining control priority when the power supply and demand plan and the hydrogen storage plan are fulfilled.

FIG. 5 is a flowchart of an example of operation in a case where both the hydrogen storage plan 5 and the power supply and demand plan 6 are fulfilled. In a case where both the hydrogen storage plan 5 and the power supply and demand plan 6 are fulfilled, the supply and demand balance determiner 403 determines whether or not an amount of power generated through PV power generation is equal to or greater than an amount of power consumption of the load such as the power consumer 3 and the load apparatus 9 as determination of balance of supply and demand. In other words, the supply and demand balance determiner 403 determines whether or not the amount of power generated through PV power generation is insufficient or there is a surplus amount of power generated through PV power generation. In a case where a difference obtained by subtracting the amount of power consumption from the amount of power generated through PV power generation is less than 0 (in a case where the amount of power generated through PV power generation is insufficient), the processing proceeds to step S12, and in a case where the difference is equal to or greater than 0 (in a case where there is a surplus amount of power generated through PV power generation), the processing proceeds to step S21.

In step S12, the controller 410 determines whether or not an absolute value of the difference between the amount of power generated through PV power generation and the amount of power consumption is equal to or less than a threshold (peak allowable value). In a case where the absolute value of the difference is equal to or less than the threshold, the controller 410 determines to purchase power (receive power from the distribution system 8) (S13). In a case where the absolute value is greater than the threshold, the controller 410 determines that a remaining amount of power of the storage battery 101 is equal to or greater than a lower limit threshold (S14). In a case where the remaining amount of power of the storage battery 101 is equal to or greater than the lower limit threshold, the controller 410 determines to discharge the storage battery 101 so that the absolute value of the difference between the amount of power generated through PV power generation and the amount of power consumption becomes equal to or less than the threshold (peak allowable value) (S15). In a case where the remaining amount of power of the storage battery 101 is less than the lower limit threshold, the controller 410 determines whether the amount of hydrogen in the hydrogen tank 103 is equal to or greater than the lower limit threshold (S16). In a case where the amount of hydrogen in the hydrogen tank 103 is equal to or greater than the lower limit threshold, the controller 410 determines to perform fuel cell power generation (FC power generation) by the fuel cell apparatus 104 so that the absolute value of the difference between the amount of power generated through PV power generation and the amount of power consumption becomes equal to or less than the threshold (peak allowable value) (S17). In a case where the amount of hydrogen in the hydrogen tank 103 is less than the lower limit threshold, the controller 410 determines that power cannot be covered by the renewable energy hydrogen system 1 (peak cut can be performed) and determines to purchase power (receive power from the distribution system 8) (S18).

The controller 410 generates control information which gives an instruction to execute the process determined in step S13, S15, S17 or S18 and transmits the control information to the renewable energy hydrogen system 1 or the energy system 10 via the transmitter 411. The renewable energy hydrogen system 1 or the energy system 10 executes the process indicated in the control information.

In this manner, the controller 410 determines priority in order of power purchase (S12: Yes), discharging of the storage battery (S15), FC power generation (S17) and power purchase (S18) in a case where the amount of power generated through PV power generation is insufficient. The controller 410 determines a process to be executed among these in accordance with the determined priority on the basis of the determination in step S12, S14 and S16 and transmits control information which gives an instruction to execute the determined process.

Note that in place of determining to purchase power in step S13 or S18, it is also possible to determine to transmit an operation stop instruction to the load such as the power consumer 3 and the load apparatus 9. In this case, the transmitter 411 transmits the operation stop instruction to the load such as the power consumer 3 and the load apparatus 9. The load stops operation in accordance with the operation stop instruction.

In step S21, the controller 410 determines whether the remaining amount of power of the storage battery 101 is less than an upper limit threshold (S21). In a case where the remaining amount of power of the storage battery 101 is less than the upper limit threshold, the controller 410 determines to charge the storage battery 101 with surplus power (power corresponding to the difference described above) of the power generated by PV power generation (S22). In a case where the remaining amount of power of the storage battery 101 is equal to or greater than the upper limit threshold, the controller 410 determines whether the amount of hydrogen in the hydrogen tank 106 is less than the upper limit threshold (S23). In a case where the amount of hydrogen in the hydrogen tank 106 is less than the upper limit threshold, the controller 410 determines to cause the hydrogen production apparatus to produce hydrogen (hydrogen to be supplied to the FCV) to be accumulated in the hydrogen tank 106 (S24). In a case where the amount of hydrogen in the hydrogen tank 106 is equal to or greater than the upper limit threshold, the controller 410 determines whether the amount of hydrogen in the hydrogen tank 103 is less than the upper limit threshold (S25). In a case where the amount of hydrogen in the hydrogen tank 106 is less than the upper limit threshold, the controller 410 determines to cause the fuel cell apparatus 104 to produce hydrogen (hydrogen for FC power generation) to be accumulated in the hydrogen tank 103 (S26). In a case where the amount of hydrogen in the hydrogen tank 106 is equal to or greater than the upper limit threshold, the controller 410 determines to sell power (transmit surplus power to the distribution system 8) (S27).

The controller 410 generates control information which gives an instruction to execute the process determined in step S13, S15, S17 or S18 and transmits the generated control information to the renewable energy hydrogen system 1 or the energy system 10 via the transmitter 411. The renewable energy hydrogen system 1 or the energy system 10 executes the process indicated in the control information.

In this manner, in a case where there is surplus power, the controller 410 determines priority in order of charging of the storage battery, production of hydrogen to be supplied to the FCV, production of hydrogen for FC, and power selling. The controller 410 determines the process to be executed among these in accordance with the determined priority on the basis of the determination in step S21, S23 and S25 and transmits control information which gives an instruction to execute the determined process.

Note that in place of determining to sell power in step S22, an operation start instruction (instruction to consume power) may be transmitted to the load such as the power consumer 3 and the load apparatus 9. In this case, the transmitter 411 transmits the operation start instruction to the load such as the power consumer 3 and the load apparatus 9. The load starts operation in accordance with the operation start instruction.

[Case where Hydrogen Storage Plan 5 is Fulfilled and Power Supply and Demand Plan 6 is not Fulfilled]

Figure 6:
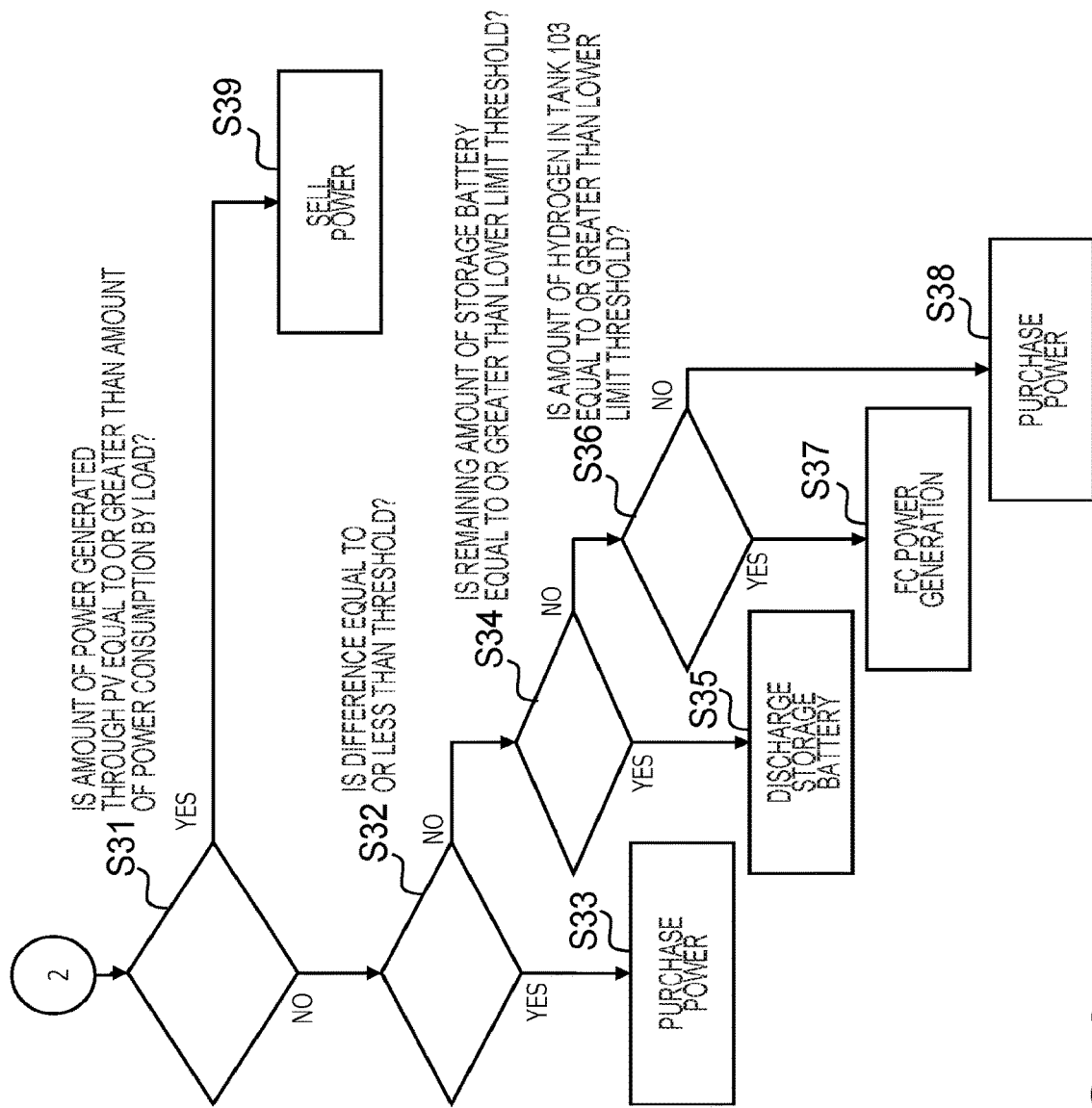
FIG. 6 is a flowchart for determining control priority when the power supply and demand plan is not fulfilled.

FIG. 6 is a flowchart of an example of operation in a case where the hydrogen storage plan 5 is fulfilled, but the power supply and demand plan 6 is not fulfilled.

The supply and demand balance determiner 403 determines whether or not the amount of power generated through PV power generation is equal to or greater than the amount of power consumption of the load such as the power consumer 3 and the load apparatus 9 as determination of balance of supply and demand (S31). In other words, the supply and demand balance determiner 403 determines whether the amount of power generated through PV power generation is insufficient or there is a surplus amount of power generated through PV power generation. In a case where a difference obtained by subtracting the amount of power consumption from the amount of power generated through PV power generation is less than 0 (in a case where the amount of power generated through PV power generation is insufficient), the processing proceeds to step S32, and in a case where the difference is equal to or greater than 0 (in a case where there is a surplus amount of power generated through PV power generation), the processing proceeds to step S39.

Processing from step S32 to S38 is the same as the processing from step S12 to S18 in FIG. 5. In other words, in step S32, the controller 410 determines whether an absolute value of the difference between the amount of power generated through PV power generation and the amount of power consumption is equal to or less than a threshold (peak allowable value). In a case where the absolute value is equal to or less than the threshold, the controller 410 determines to purchase power (receive power from the distribution system 8) (S33). In a case where the absolute value is greater than the threshold, the controller 410 determines whether the remaining amount of power of the storage battery 101 is equal to or greater than a lower limit threshold (S34). In a case where the remaining amount of power of the storage battery 101 is equal to or greater than the lower limit threshold, the controller 410 determines to discharge the storage battery 101 (S35). In a case where the remaining amount of power of the storage battery 101 is less than the lower limit threshold, the controller 410 determines whether the amount of hydrogen in the hydrogen tank 103 is equal to or greater than a lower limit threshold (S36). In a case where the amount of hydrogen in the hydrogen tank 103 is equal to or greater than the lower limit threshold, the controller 410 determines to cause the fuel cell apparatus 104 to perform fuel cell power generation (FC power generation) (S37). In a case where the amount of hydrogen in the hydrogen tank 103 is less than the lower limit threshold, the controller 410 determines that power cannot be covered with the renewable energy hydrogen system 1 and determines to purchase power (receive power from the distribution system 8) (S38).

The controller 410 generates control information which gives an instruction to execute the process determined in step S33, S35, S37 or S38 and transmits the control information to the renewable energy hydrogen system 1 or the energy system 10 via the transmitter 411. The renewable energy hydrogen system 1 or the energy system 10 executes the process indicated in the control information.

In this manner, in a case where the amount of power generated through PV power generation is insufficient, the controller 410 determines priority in order of power purchase (S33), discharging of the storage battery (S35), FC power generation (S37) and power purchase (S38). The controller 410 determines the process to be executed among these in accordance with the determined priority on the basis of the determination in step S32, S34 and S36 and transmits control information which gives an instruction to execute the determined process.

Meanwhile, in step S39, the controller 410 determines to sell power (transmit surplus power to the distribution system 8) (S39). The controller 410 generates control information which gives an instruction to execute the process determined in step S39 and transmits the control information to the renewable energy hydrogen system 1 or the energy system 10 via the transmitter 411.

In this manner, the controller 410 determines to sell power with the highest priority in a case where there is surplus power.

[Case where Hydrogen Storage Plan 5 is not Fulfilled and Power Supply and Demand Plan 6 is Fulfilled]

Figure 7:
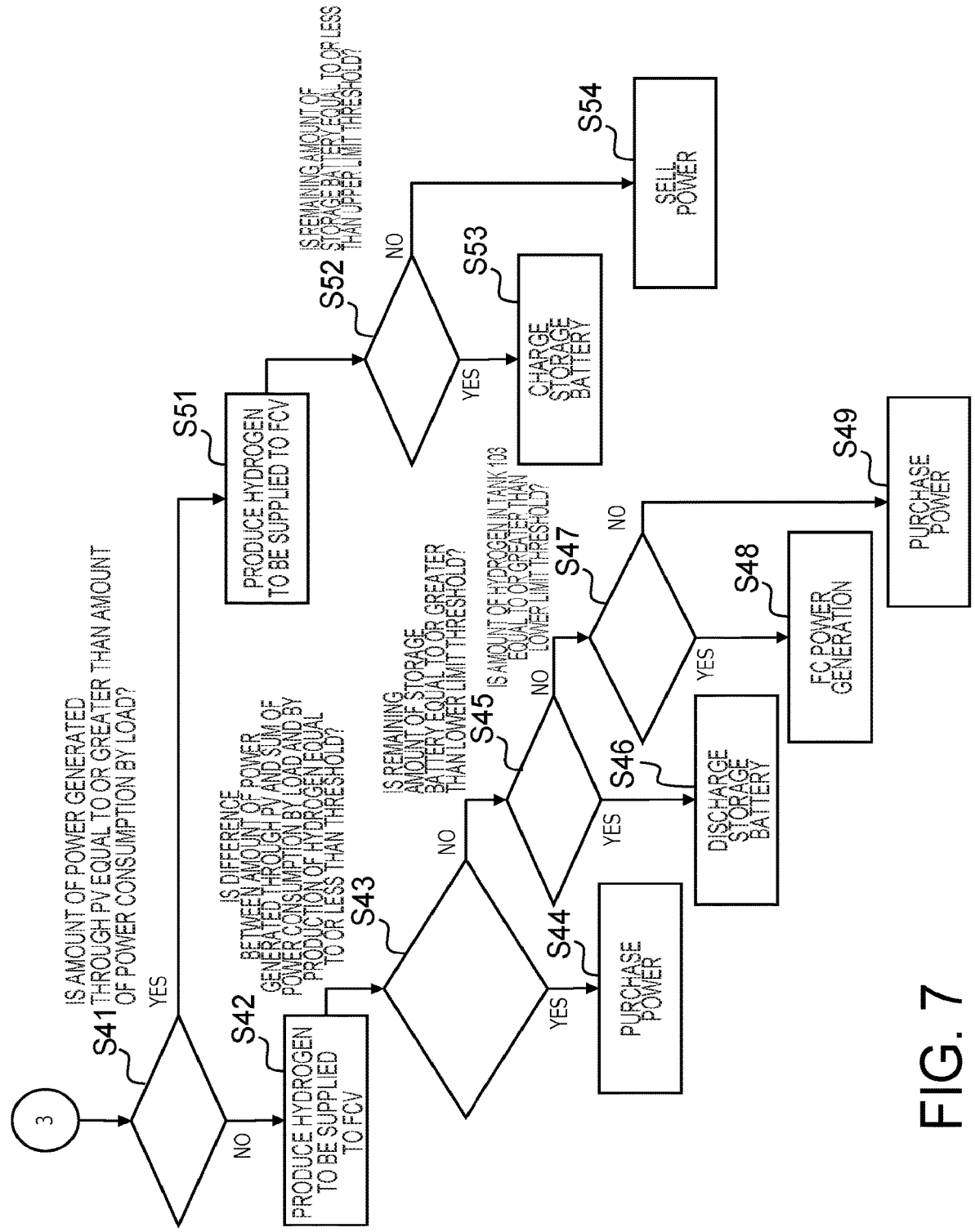
FIG. 7 is a flowchart for determining control priority when the hydrogen storage plan is not fulfilled.

FIG. 7 is a flowchart of an example of operation in a case where the hydrogen storage plan 5 is not fulfilled, but the power supply and demand plan 6 is fulfilled.

The supply and demand balance determiner 403 determines whether or not the amount of power generated through PV power generation is equal to or greater than the amount of power consumption of the load such as the power consumer 3 and the load apparatus 9 as determination of balance of supply and demand (S41). In other words, the supply and demand balance determiner 403 determines whether the amount of power generated through PV power generation is insufficient or there is a surplus amount of power generated through PV power generation. In a case where a difference obtained by subtracting the amount of power consumption from the amount of power generated through PV power generation is less than 0 (in a case where the amount of power generated through PV power generation is insufficient), the processing proceeds to step S42, and in a case where the difference is equal to or greater than 0 (in a case where there is a surplus amount of power generated through PV power generation), the processing proceeds to step S51.

In step S42, the controller 410 determines to cause the hydrogen production apparatus 102 to operate to produce hydrogen to be supplied to a fuel cell vehicle (hydrogen to be accumulated in the hydrogen tank 106). The controller 410 transmits control information which gives an instruction to perform the determined operation to the renewable energy hydrogen system 1 or the energy system 10 via the transmitter 411. The renewable energy hydrogen system 1 or the energy system 10 executes the process indicated in the control information. In other words, the hydrogen production apparatus 102 produces hydrogen and accumulates the produced hydrogen in the hydrogen tank 106.

After the control information is transmitted in step S42, a difference is calculated by subtracting a sum of the amount of power consumption of the load such as the power consumer 3 and the load apparatus 9 and the amount of power consumption by production of hydrogen from the amount of power generated through PV power generation. It is determined whether an absolute value of the difference is equal to or less than a threshold (peak allowable value) (S43). In a case where the absolute value of the difference is equal to or less than the threshold, the controller 410 determines to purchase power (receive power from the distribution system 8) (S44). In other words, unless the difference (an amount of power required to be secured) exceeds the threshold (peak allowable value), power is purchased to secure power with the highest priority. In a case where the absolute value is greater than the threshold, the controller 410 determines whether the remaining amount of power of the storage battery 101 is equal to or greater than a lower limit threshold (S45). In a case where the remaining amount of power of the storage battery 101 is equal to or greater than the lower limit threshold, the controller 410 determines to discharge the storage battery 101 (S46). In a case where the remaining amount of power of the storage battery 101 is less than the lower limit threshold, the controller 410 determines whether the amount of hydrogen in the hydrogen tank 103 is equal to or greater than a lower limit threshold (S47). In a case where the amount of hydrogen in the hydrogen tank 103 is equal to or greater than the lower limit threshold, the controller 410 determines to cause the fuel cell apparatus 104 to perform fuel cell power generation (FC power generation) (S48). In a case where the amount of hydrogen in the hydrogen tank 103 is less than the lower limit threshold, the controller 410 determines that power cannot be covered with power generation or discharging in the renewable energy hydrogen system 1 and determines to purchase power (receive power from the distribution system 8) (S49).

The controller 410 generates control information which gives an instruction to execute the process determined in step S44, S46, S48 or S49 and transmits the control information to the renewable energy hydrogen system 1 or the energy system 10 via the transmitter 411. The renewable energy hydrogen system 1 or the energy system 10 executes the process indicated in the control information.

In this manner, in a case where the amount of power generated through PV power generation is insufficient, the controller 410 determines to produce hydrogen with the highest priority and further determines priority in order of power purchase (S44), discharging of the storage battery (S46), FC power generation (S48) and power purchase (S49). The controller 410 determines the process to be executed among these in accordance with the determined priority on the basis of the determination in step S43, S45 and S47 and transmits control information which gives an instruction to execute the determined process.

Meanwhile, in step S51, the controller 410 determines to cause the hydrogen production apparatus 102 to operate to produce hydrogen to be supplied to a fuel cell vehicle (hydrogen to be accumulated in the hydrogen tank 106). The controller 410 transmits control information which gives an instruction to perform the determined operation to the renewable energy hydrogen system 1 or the energy system 10 via the transmitter 411. The renewable energy hydrogen system 1 or the energy system 10 executes the process indicated in the control information. In other words, the hydrogen production apparatus 102 produces hydrogen and accumulates the produced hydrogen in the hydrogen tank 106.

After the control information is transmitted in step S51, the controller 410 determines whether the remaining amount of power of the storage battery 101 is less than an upper limit threshold in step S52 (S52). In a case where the remaining amount of power of the storage battery 101 is less than the upper limit threshold, the controller 410 determines to charge the storage battery 101 with surplus power (surplus power exceeding power to be used at the hydrogen production apparatus 102) of power generated through PV power generation (S53). In a case where the remaining amount of power of the storage battery 101 is equal to or greater than the upper limit threshold, the controller 410 determines to sell power (transmit surplus power to the distribution system 8) (S54).

The controller 410 generates control information which gives an instruction to execute the process determined in step S53 or S43 and transmits the control information to the renewable energy hydrogen system 1 or the energy system 10 via the transmitter 411. The renewable energy hydrogen system 1 or the energy system 10 executes the process indicated in the control information.

In this manner, in a case where there is surplus power, the controller 410 determines to produce hydrogen to be supplied to an FCV with the highest priority and determines priority in order of charging of the storage battery (S53) and power selling (S54). The controller 410 determines the process to be executed among these in accordance with the determined priority on the basis of the determination in step S52 and transmits control information which gives an instruction to execute the determined process.

[Case where Neither Hydrogen Storage Plan 5 Nor Power Supply and Demand Plan 6 is Fulfilled]

Figure 8:
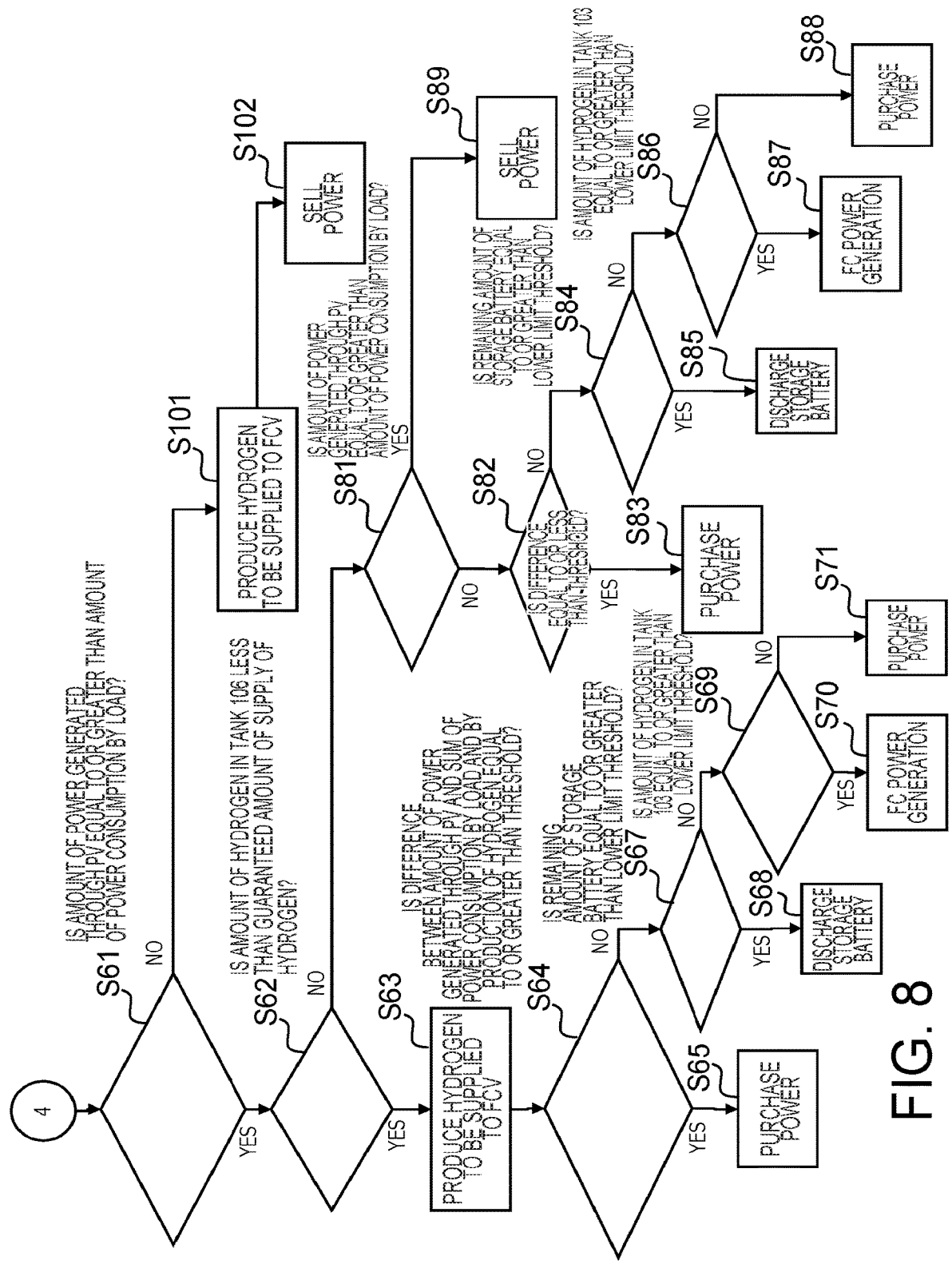
FIG. 8 is a flowchart for determining control priority when neither the power supply and demand plan nor the hydrogen storage plan is fulfilled.

FIG. 8 is a flowchart of an example of operation in a case where neither the hydrogen storage plan 5 nor the power supply and demand plan 6 is fulfilled.

The supply and demand balance determiner 403 determines whether or not the amount of power generated through PV power generation is equal to or greater than the amount of power consumption of the load such as the power consumer 3 and the load apparatus 9 as determination of balance of supply and demand (S61). In other words, the supply and demand balance determiner 403 determines whether the amount of power generated through PV power generation is insufficient or there is a surplus amount of power generated through PV power generation. In a case where a difference obtained by subtracting the amount of power consumption from the amount of power generated through PV power generation is less than 0 (in a case where the amount of power generated through PV power generation is insufficient), the processing proceeds to step S62, and in a case where the difference is equal to or greater than 0 (in a case where there is a surplus amount of power generated through PV power generation), the processing proceeds to step S101.

In step S62, the controller 410 determines whether the amount of hydrogen in the hydrogen tank 106 is less than a threshold (for example, a guaranteed amount of supply of hydrogen of one day). In a case where the amount of hydrogen in the hydrogen tank 106 is less than the threshold, the processing proceeds to step S63, and in a case where the amount of hydrogen in the hydrogen tank 106 is equal to or greater than the threshold, the processing proceeds to step S81.

Processing from step S63 to S71 is similar to the processing from step S42 to S49 in FIG. 7. In other words, in step S63, the controller 410 determines to cause the hydrogen production apparatus 102 to operate to produce hydrogen to be supplied to a fuel cell vehicle (hydrogen to be accumulated in the hydrogen tank 106). The controller 410 transmits control information which gives an instruction to perform the determined operation to the renewable energy hydrogen system 1 or the energy system 10 via the transmitter 411. The renewable energy hydrogen system 1 or the energy system 10 executes the process indicated in the control information. In other words, the hydrogen production apparatus 102 produces hydrogen and accumulates the produced hydrogen in the hydrogen tank 106. After the control information is transmitted in step S63, it is determined whether an absolute value of a difference obtained by subtracting a sum of the amount of power consumption of the load such as the power consumer 3 and the load apparatus 9 and the amount of power consumption by production of hydrogen from the amount of power generated through PV power generation is equal to or less than a threshold (peak allowable value) (S64). In a case where the absolute value of the difference is equal to or less than the threshold, the controller 410 determines to purchase power (receive power from the distribution system 8) (S65). In other words, unless the difference (an amount of power required to be secured) exceeds the threshold (peak allowable value), power is purchased to secure power with the highest priority. In a case where the absolute value is greater than the threshold, the controller 410 determines whether the remaining amount of power of the storage battery 101 is equal to or greater than a lower limit threshold (S67). In a case where the remaining amount of power of the storage battery 101 is equal to or greater than the lower limit threshold, the controller 410 determines to discharge the storage battery 101 (S68). In a case where the remaining amount of power of the storage battery 101 is less than the lower limit threshold, the controller 410 determines whether the amount of hydrogen in the hydrogen tank 103 is equal to or greater than the lower limit threshold (S69). In a case where the amount of hydrogen in the hydrogen tank 103 is equal to or greater than the lower limit threshold, the controller 410 determines to cause the fuel cell apparatus 104 to perform fuel cell power generation (FC power generation) (S70). In a case where the amount of hydrogen in the hydrogen tank 103 is less than the lower limit threshold, the controller 410 determines that power cannot be secured by discharging or power generation in the renewable energy hydrogen system 1 and determines to purchase power (receive power from the distribution system 8) (S71).

The controller 410 generates control information which gives an instruction to execute the process determined in step S65, S68, S70 or S71 and transmits the control information to the renewable energy hydrogen system 1 or the energy system 10 via the transmitter 411. The renewable energy hydrogen system 1 or the energy system 10 executes the process indicated in the control information.

In this manner, in a case where the amount of hydrogen in the hydrogen tank 106 is less than a threshold (a guaranteed amount of supply of hydrogen), the controller 410 determines to produce hydrogen with the highest priority and further determines priority in order of power purchase (S65), discharging of the storage battery (S68), FC power generation (S70) and power purchase (S71). The controller 410 determines the process to be executed among these in accordance with the determined priority on the basis of the determination in step S64, S67 and S69 and transmits control information which gives an instruction to execute the determined process.

Processing from step S81 to step S89 is similar to the processing from step S31 to S39 in FIG. 6. In other words, the supply and demand balance determiner 403 determines whether or not the amount of power generated through PV power generation is equal to or greater than an amount of power consumption of the load such as the power consumer 3 and the load apparatus 9 as determination of balance of supply and demand in step S81 (S81). In other words, the supply and demand balance determiner 403 determines whether the amount of power generated through PV power generation is insufficient or there is a surplus amount of power generated through PV power generation. In a case where a difference obtained by subtracting the amount of power consumption from the amount of power generated through PV power generation is less than 0 (in a case where the amount of power generated through PV power generation is insufficient), the processing proceeds to step S82, and in a case where the difference is equal to or greater than 0 (in a case where there is a surplus amount of power generated through PV power generation), the processing proceeds to step S89. The controller 410 determines whether an absolute value of a difference between the amount of power generated through PV power generation and the amount of power consumption is equal to or less than a threshold (peak allowable value) (S82). In a case where the absolute value is equal to or less than the threshold, the controller 410 determines to purchase power (receive power from the distribution system 8) (S83). In a case where the absolute value is greater than the threshold, the controller 410 determines whether the remaining amount of power of the storage battery 101 is equal to or greater than a lower limit threshold (S84). In a case where the remaining amount of power of the storage battery 101 is equal to or greater than the lower limit threshold, the controller 410 determines to discharge the storage battery 101 (S85). In a case where the remaining amount of power of the storage battery 101 is less than the lower limit threshold, the controller 410 determines whether the amount of hydrogen in the hydrogen tank 103 is equal to or greater than a lower limit threshold (S86). In a case where the amount of hydrogen in the hydrogen tank 103 is equal to or greater than the lower limit threshold, the controller 410 determines to cause the fuel cell apparatus 104 to perform fuel cell power generation (FC power generation) (S87). In a case where the amount of hydrogen in the hydrogen tank 103 is less than the lower limit threshold, the controller 410 determines that power cannot be covered by discharging or power generation in the renewable energy hydrogen system 1 and determines to purchase power (receive power from the distribution system 8) (S88).

The controller 410 generates control information which gives an instruction to execute the process determined in step S83, S85, S87 or S88 and transmits the control information to the renewable energy hydrogen system 1 or the energy system 10 via the transmitter 411. The renewable energy hydrogen system 1 or the energy system 10 executes the process indicated in the control information.

In this manner, the controller 410 performs control to purchase power in a case where power required to be secured (the difference described above) is equal to or less than the threshold and perform discharging of the storage battery (S35), FC power generation (S37) and power purchase (S38) in this order of priority in a case where it is necessary to secure power greater than the difference. Peak cut is performed through this processing.

Meanwhile, in a case where the difference obtained by subtracting the amount of power consumption from the amount of power generated through PV power generation is equal to or greater than 0 in step S81 (in a case where there is a surplus amount of power generated through PV power generation), the controller 410 determines to sell power (transmit surplus power to the distribution system 8) (S89). The controller 410 generates control information which gives an instruction to execute the process determined in step S89 and transmits the control information to the renewable energy hydrogen system 1 or the energy system 10 via the transmitter 411. In this manner, in a case where there is surplus power, the controller 410 sells power with the highest priority.

In step S101, the controller 410 determines to cause the hydrogen production apparatus 102 to operate to produce hydrogen to be supplied to a fuel cell vehicle (hydrogen to be accumulated in the hydrogen tank 106). The controller 410 transmits control information which gives an instruction to perform the determined operation to the renewable energy hydrogen system 1 or the energy system 10 via the transmitter 411. The renewable energy hydrogen system 1 or the energy system 10 executes the process indicated in the control information. In other words, the hydrogen production apparatus 102 produces hydrogen and accumulates the produced hydrogen in the hydrogen tank 106. After the control information is transmitted in step S101, the controller 410 determines to sell surplus power generated through the PV power generation (surplus power exceeding power to be used at the hydrogen production apparatus 102) in step S102 (S102).

The controller 410 generates control information which gives an instruction to execute the process determined in step S102 and transmits the control information to the renewable energy hydrogen system 1 or the energy system 10 via the transmitter 411. The renewable energy hydrogen system 1 or the energy system 10 executes the process indicated in the control information.

In this manner, in a case where there is surplus power, the controller 410 determines to produce hydrogen to be supplied to an FCV with the highest priority and further determines to sell surplus power (surplus power exceeding power to be used at the hydrogen production apparatus 102).

As described above, according to the present embodiment, long-term plans such as the power supply and demand plan which is a plan of a cumulative amount of power to be transmitted and received to and from the distribution system 8 and the hydrogen storage plan which is a plan of an integrated amount of supply and demand of hydrogen (a storage amount of the hydrogen tank) are input. Priority of operation of respective components (system components) in the energy system 10 or the renewable energy hydrogen system 1 is changed in accordance with fulfillment states of the power supply and demand plan and the hydrogen storage plan. This enables the energy system to efficiently operate with a long-term perspective.

Second Embodiment

Figure 9:
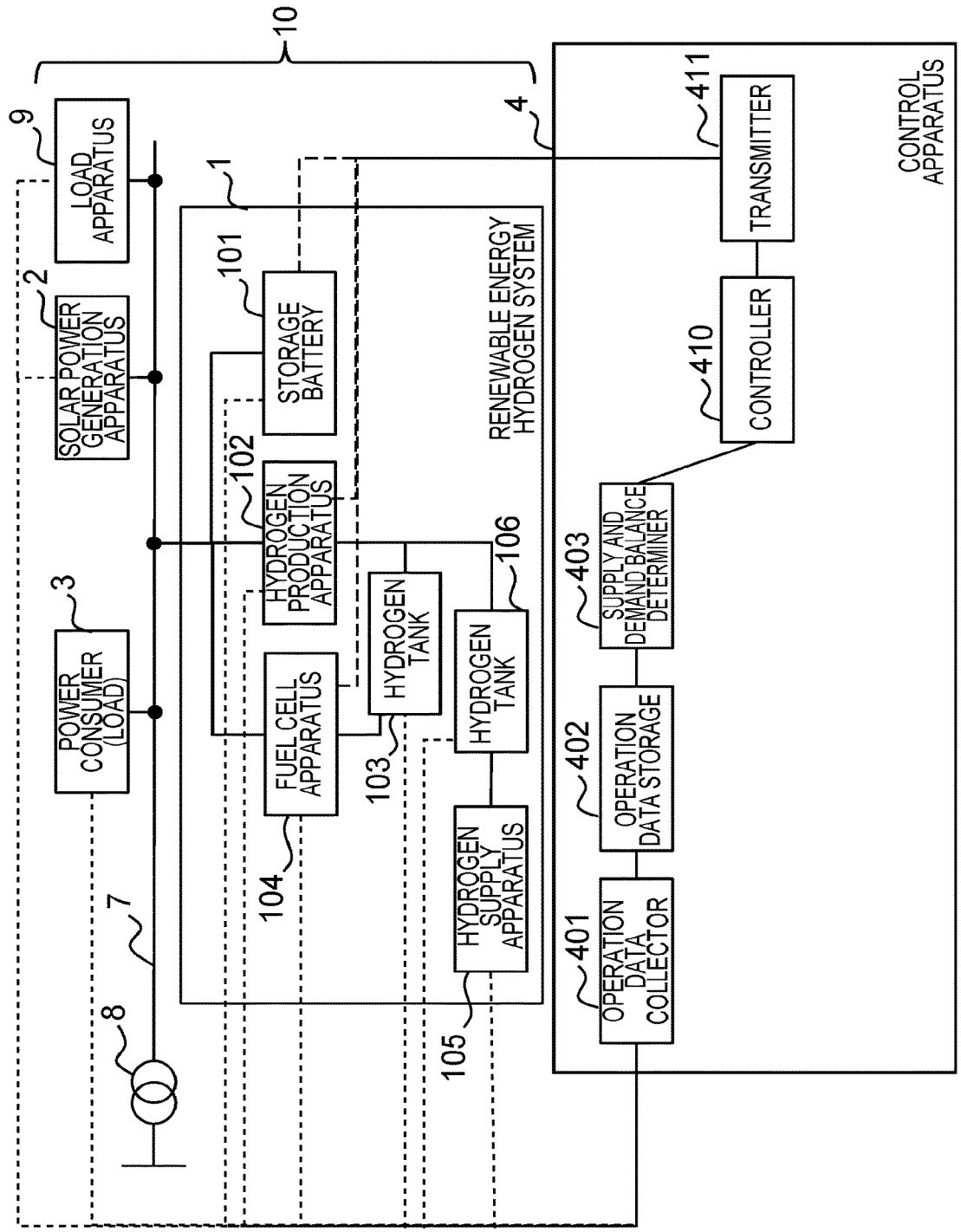
FIG. 9 is a block diagram of an information processing system according to a second embodiment.

FIG. 9 is a block diagram illustrating an entire configuration of an information processing system 120 as an information processing system according to a second embodiment. The same reference numerals will be assigned to components having the same name as name of the components in FIG. 1, and detailed description will be omitted.

Components 404 to 409 are removed from the control apparatus 4 in the information processing system 100 in the first embodiment in FIG. 1. In other words, neither determination as to whether or not the hydrogen storage plan is fulfilled nor determination as to whether or not the power supply and demand plan is fulfilled is performed. For example, operation in the flowchart of one of FIG. 5 to FIG. 8 is performed as operation in the second embodiment. Alternatively, operation modified from the flowcharts in FIG. 5 to FIG. 8 may be performed.

Third Embodiment

Figure 10:
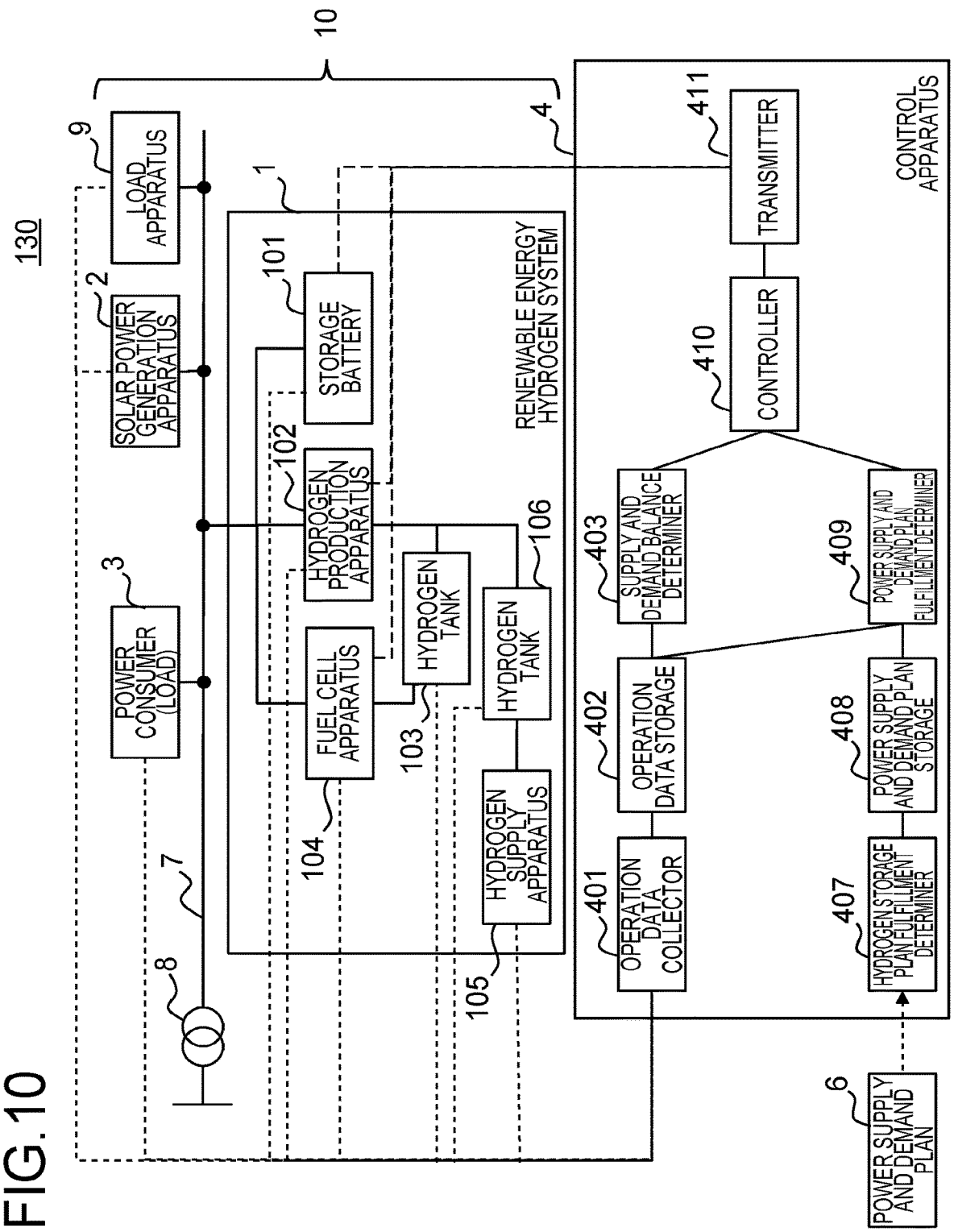
FIG. 10 is a block diagram of an information processing system according to a third embodiment.

FIG. 10 is a block diagram illustrating an entire configuration of an information processing system 130 as an information processing system according to a third embodiment. The same reference numerals will be assigned to components having the same name as name of the components in FIG. 1, and detailed description will be omitted.

Components 404 to 406 are removed from the control apparatus 4 in the information processing system 100 in the first embodiment in FIG. 1. In other words, determination as to whether the hydrogen storage plan is fulfilled is not performed. For example, the processing in step S1 in FIG. 4 is omitted as operation in the third embodiment, and processing which starts from step S2 or S5 is performed. In other words, in a case where the processing starts from step S2, thereafter, the processing in the flowchart in FIG. 5 or FIG. 6 is performed. Operation modified from the flowchart in FIG. 5 or FIG. 6 may be performed. Further, in a case where the processing starts from step S3, thereafter, the processing in the flowchart in FIG. or FIG. 8 is performed. Operation modified from the flowchart in FIG. 7 or FIG. 8 may be performed.

Fourth Embodiment

Figure 11:
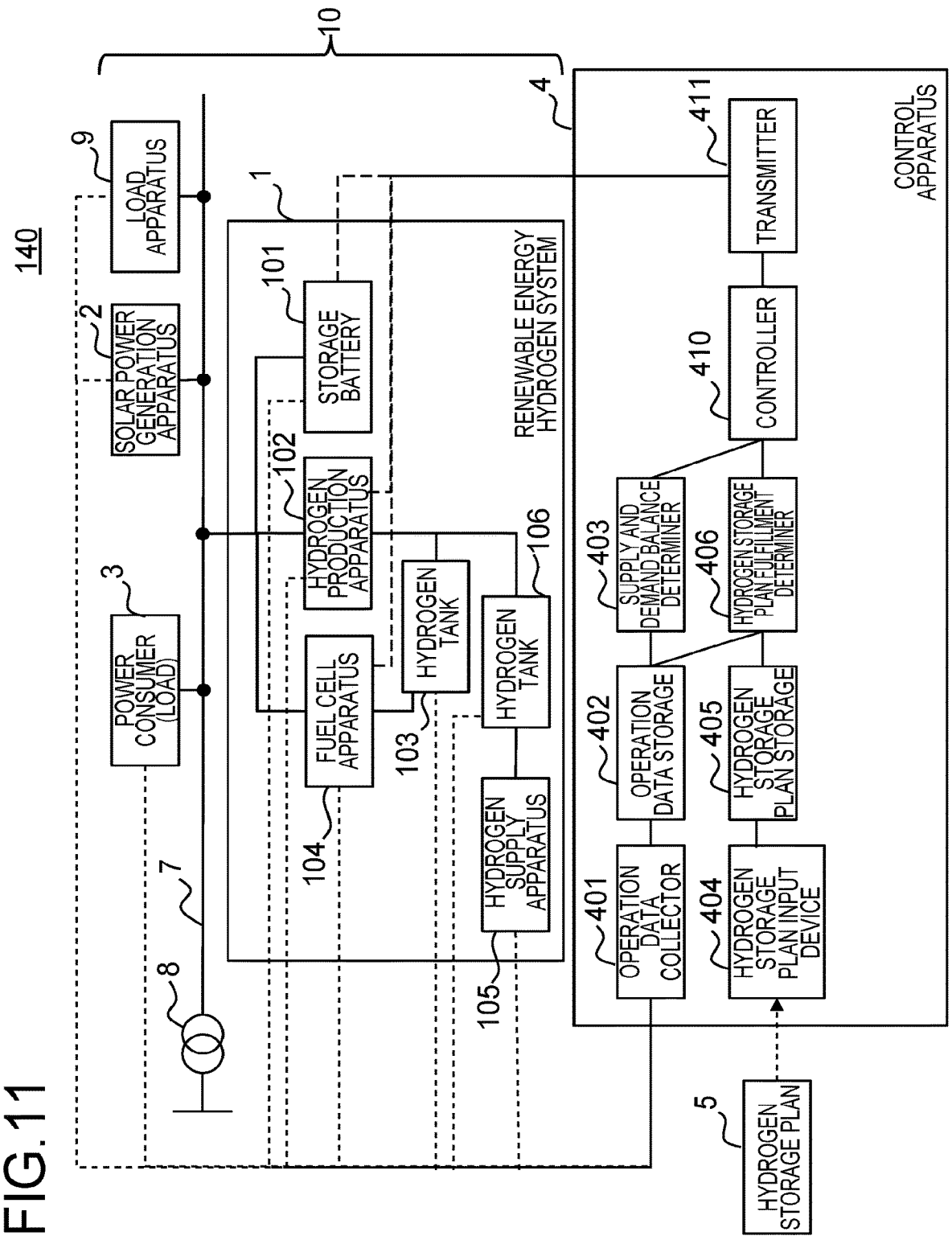
FIG. 11 is a block diagram of an information processing system according to a fourth embodiment.

FIG. 11 is a block diagram illustrating an entire configuration of an information processing system 140 as an information processing system according to a fourth embodiment. The same reference numerals will be assigned to components having the same name as name of the components in FIG. 1, and detailed description will be omitted.

Components 407 to 409 are removed from the control apparatus 4 in the information processing system 100 in the first embodiment in FIG. 1. In other words, determination as to whether the power supply and demand plan is fulfilled is not performed. For example, the processing in step S2 and S3 in FIG. 4 is omitted as operation in the fourth embodiment. In a case where the amount of hydrogen in the hydrogen tank 106 is equal to or greater than a planned value in step S1, the processing in the flowchart in FIG. 5 or FIG. 6 is performed. Operation modified from the flowchart in FIG. 5 or FIG. 6 may be performed. In a case where the amount of hydrogen in the hydrogen tank 106 is less than the planned value, the processing in the flowchart in FIG. 7 or FIG. 8 is performed. Operation modified from the flowchart in FIG. 7 or FIG. 8 may be performed.

Fifth Embodiment

Figure 12:
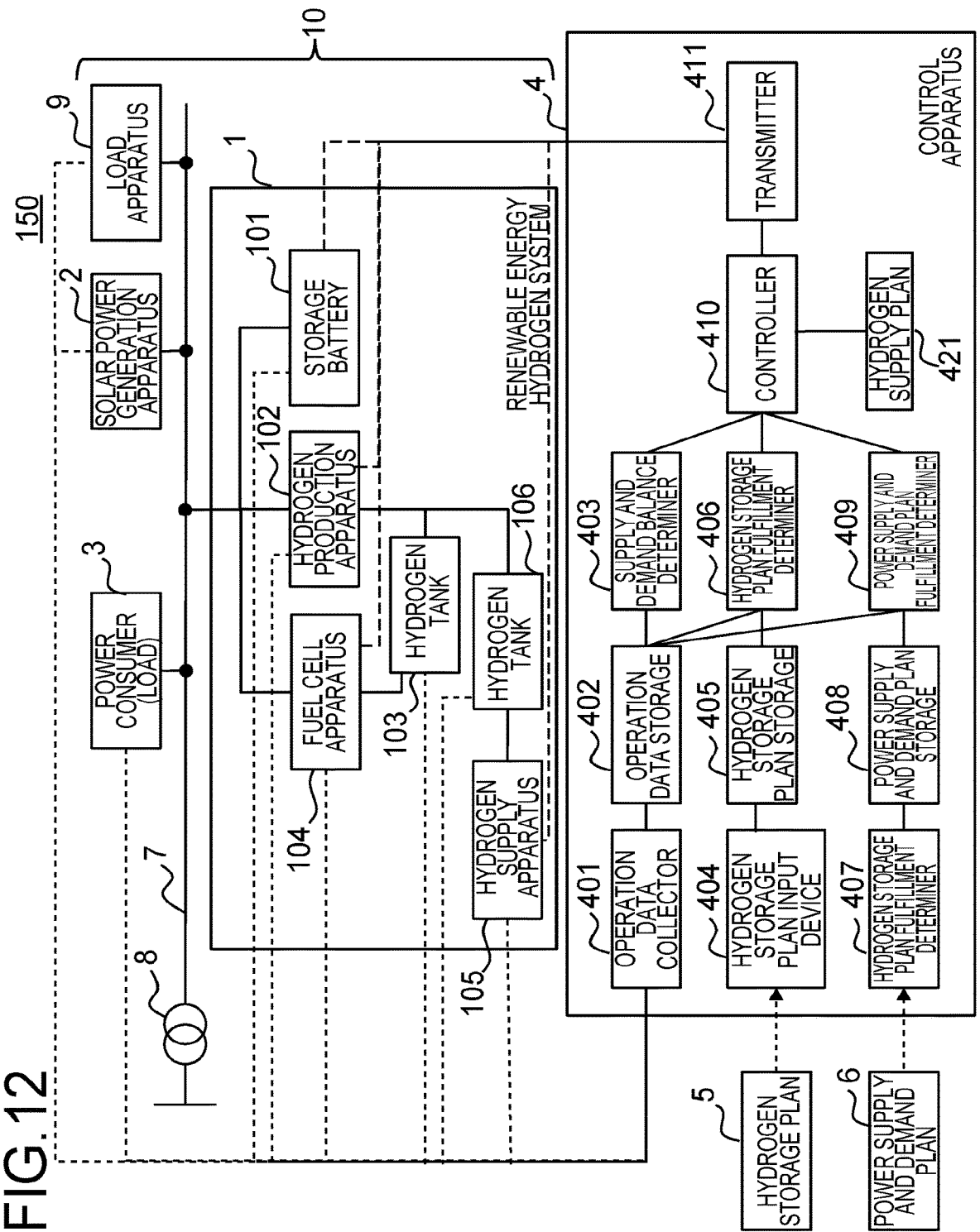
FIG. 12 is a block diagram of an information processing system according to a fifth embodiment.

FIG. 12 is a block diagram illustrating an entire configuration of an information processing system 150 as an information processing system according to a fifth embodiment. The same reference numerals will be assigned to components having the same name as name of the components in FIG. 1, and detailed description will be omitted.

A hydrogen supply plan 421 is added the control apparatus 4 in the information processing system 100 in the first embodiment in FIG. 1. The hydrogen supply plan 421 is a supply plan by the hydrogen supply apparatus 105 and is a plan including time and an amount of hydrogen. A plan period of the hydrogen supply plan 421 is input to the control apparatus 4 from, for example, an external input apparatus (not illustrated). The plan period of the hydrogen supply plan 421 is shorter than periods of the hydrogen storage plan 5 and the power supply and demand plan 6 as an example. For example, in a case where it becomes necessary to supply hydrogen to a certain FCV at a certain time period, a supply plan of hydrogen at the time period is provided as the hydrogen supply plan 421.

The controller 410 controls the renewable energy hydrogen system or the energy system 10 while setting the hydrogen supply plan 421 as a constraint condition. The controller 410 generates control information for executing the hydrogen supply plan 421 and transmits the generated control information to the renewable energy hydrogen system 1 via the transmitter 411. In the renewable energy hydrogen system 1, the hydrogen supply apparatus 105 receives hydrogen from the hydrogen tank 106 in accordance with the control information and supplies the received hydrogen to an external apparatus.

The controller 410 performs operation similar to the operation in the first embodiment while executing the hydrogen supply plan 421 in this manner. This implements operation similar to the operation in the first embodiment while fulfilling the hydrogen supply plan 421. The hydrogen supply apparatus 105 uses hydrogen in the hydrogen tank 106, and thus, priority of production of hydrogen to be accumulated in the hydrogen tank 106 may be made higher than the priority in the first embodiment.

While an example has been described in the present embodiment where a configuration which performs the processing based on the hydrogen supply plan 421 is added to the first embodiment, the configuration may be added to the second to the fourth embodiments.

Sixth Embodiment

Figure 13:
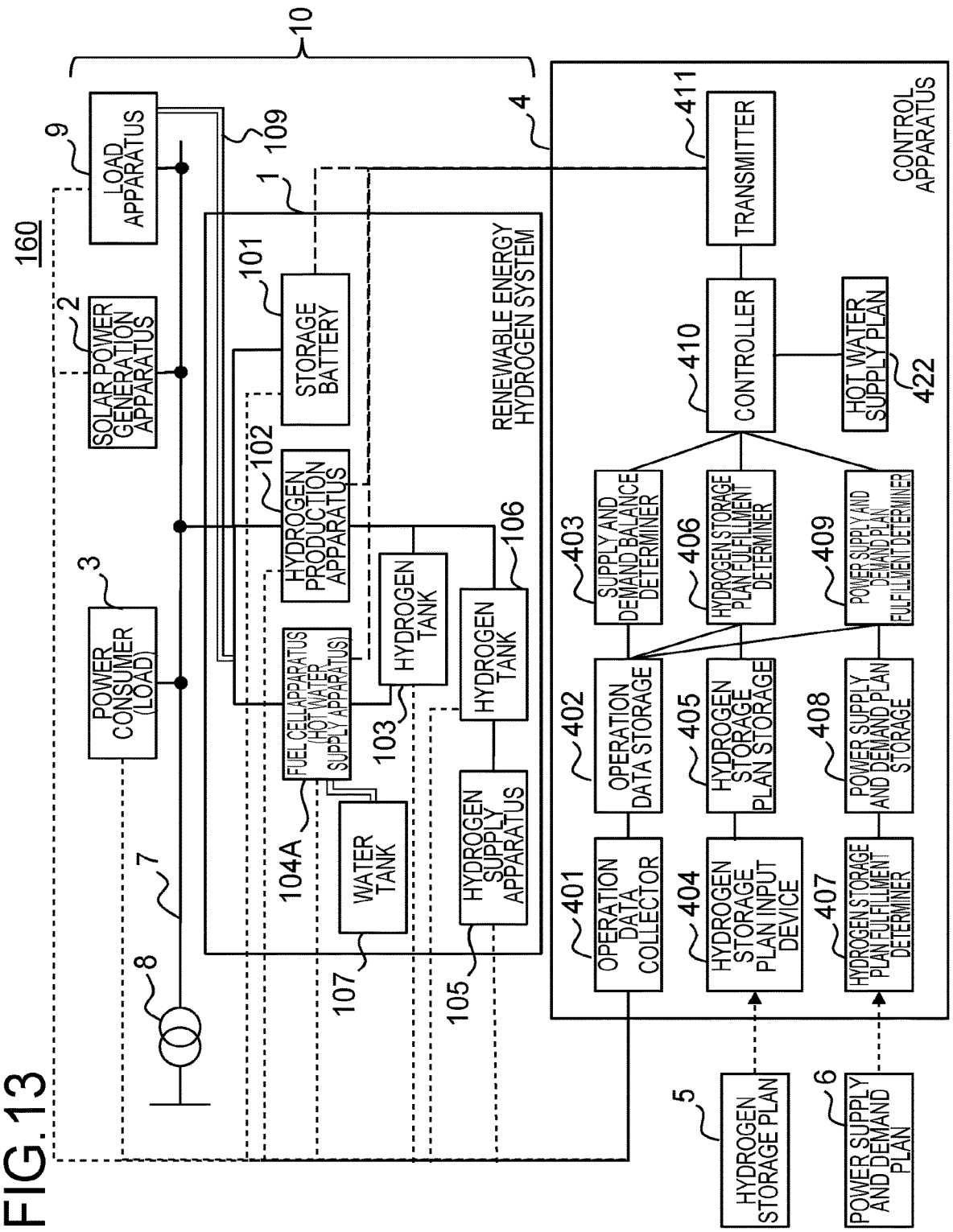
FIG. 13 is a block diagram of an information processing system according to a sixth embodiment.

FIG. 13 is a block diagram illustrating an entire configuration of an information processing system 160 as an information processing system according to a sixth embodiment. The same reference numerals will be assigned to components having the same name as name of the components in FIG. 1, and detailed description will be omitted.

A hot water supply plan 422 is added to the control apparatus 4 in the information processing system 100 in the first embodiment in FIG. 1. Further, a water tank 107 is added to the renewable energy hydrogen system 1. The fuel cell apparatus 104A includes a hot water supply apparatus which supplies water (hot water) heated by utilizing heat of power generation.

The fuel cell apparatus 104A heats water in the water tank 107 by utilizing heat of power generation when power is generated using hydrogen in the hydrogen tank 103 and provides the heated water to the load apparatus 9 (which may be a facility, for example, a factory and a pool) via a pipe 109. The load apparatus 9 is external equipment which is connected to a power line 7 and which consumes power supplied from the power line 7 as a load.

The hot water supply plan 422 is a plan including time and a hot water supply amount. A plan period of the hot water supply plan 422 is input to the control apparatus 4 from, for example, an external input apparatus (not illustrated). The plan period of the hot water supply plan 422 is shorter than periods of the hydrogen storage plan 5 and the power supply and demand plan 6 as an example. For example, in a case where it becomes necessary to supply hot water to the load apparatus 9 at a certain time period, a supply plan of hot water at the time period is provided as the hot water supply plan 422.

The controller 410 controls the renewable energy hydrogen system or the energy system 10 while setting the hot water supply plan 422 as a constraint condition. The controller 410 generates control information for executing the hot water supply plan 422 and transmits the generated control information to the renewable energy hydrogen system 1 via the transmitter 411. At the renewable energy hydrogen system 1, the fuel cell apparatus 104A receives hydrogen from the hydrogen tank 103 in accordance with the control information and generates power and heats water using the received hydrogen. The fuel cell apparatus 104A supplies the heated water to the load apparatus 9.

The controller 410 performs operation similar to the operation in the first embodiment while executing the hot water supply plan 422 in this manner. This implements operation similar to the operation in the first embodiment while fulfilling the hot water supply plan 422. The fuel cell apparatus 104A uses the hydrogen in the hydrogen tank 103, and thus, priority of production of hydrogen to be accumulated in the hydrogen tank 103 may be made higher than the priority in the first embodiment.

While an example has been described in the present embodiment where a configuration which performs the processing based on the hot water supply plan 422 is added to the first embodiment, the configuration may be added to the second to the fifth embodiments.

(Hardware Configuration)

Figure 14:
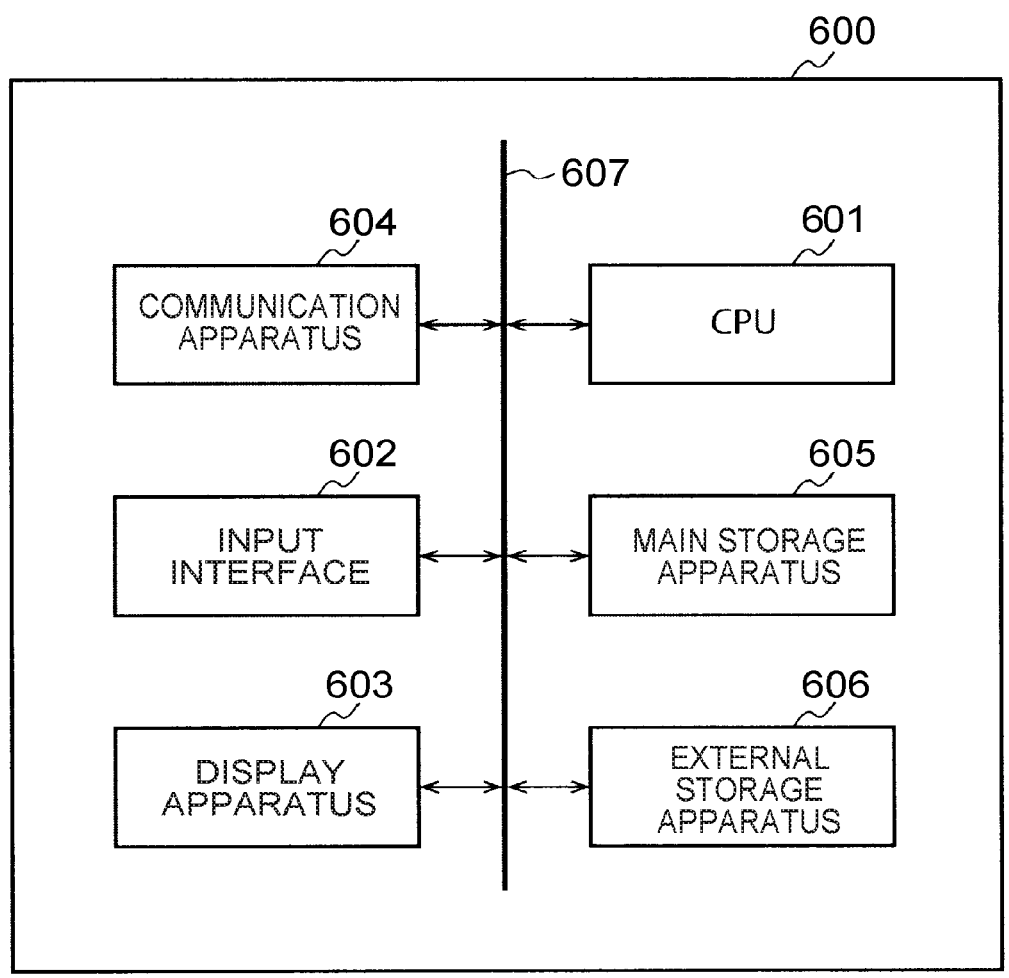
FIG. 14 is a hardware block diagram of an information processing apparatus according to the embodiments of the present invention.

FIG. 14 illustrates a hardware configuration of the information processing apparatus in FIG. 1. The information processing apparatus in FIG. 1 is constructed of a computer apparatus 600. The computer apparatus 600 is provided with a CPU 601, an input interface 602, a display device 603, a communication device 604, a main storage 605 and an external storage device 606, which are mutually connected by a bus 607.

The CPU (central processing unit) 601 executes a computer program for implementing the above-mentioned respective functional components of the information processing apparatus in the main storage 605. The CPU 601 executes the computer program and thereby implements the respective functional components.

The input interface 602 is a circuit for inputting operation signals from the input device such as a keyboard, mouse, and touch panel or the like into the apparatus. The input device 120 that carries out the input function can be constructed on the input interface 602.

The display device 603 displays data or information outputted from the information processing apparatus. The display device 603 is, for example, an LCD (Liquid Crystal Display), a CRT (Cathode Ray Tube), and a PDP (plasma display), but the display device 603 is not limited thereto. The data or information outputted from computer apparatus 600 can be displayed by this display device 603. The output device 130 can be constructed on the display device 603.

The communication device 604 is a circuit for the information processing apparatus 101 to communicate with the external device by wireless or wired means. Information can be inputted from the external device via the communication device 604. The information inputted from the external device can be stored in the DB, the main storage 605, or the external storage device 606.

The main storage 605 stores a program that implements processing of the information processing apparatus, data necessary to execute the program and data generated by executing the program. The program is developed and executed on the main storage 605. The main storage 605 may be, for example, RAM, DRAM or SRAM, but it is not limited to this. The various DBs and the storage in each embodiment may be constructed on the main storage 605.

The external storage device 606 stores the above-described program and data necessary to execute the program, data generated by executing the program or the like. The program and data are read into the main storage 605 during processing of the present embodiment. The external storage device 606 is, for example, a hard disk, an optical disk, a flash memory, or a magnetic tape, but it is not limited to this. The various DBs and the storage in each embodiment may be constructed on the external storage device 606.

Note that the above-described program may be pre-installed in the computer apparatus 600 or may be stored in a storage medium such as a CD-ROM. The program may be uploaded on the Internet.

Note that the computer apparatus 600 may be provided with one or a plurality of processors 601, input interfaces 602, display devices 603, communication devices 604 and main storages 605, and peripheral devices such as a printer and a scanner may be connected thereto.

In addition, the information processing apparatus 101 may be constructed of the single computer apparatus 600 or may be configured as a system composed of a plurality of mutually connected computer apparatuses 600.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing apparatus comprising:
receiving circuitry configured to receive operation data of an energy system,
the energy system being capable of inputting and outputting power to and from a power line to which a power system and a load are connected, and
the energy system including
a hydrogen production apparatus producing hydrogen,
a first hydrogen accumulation apparatus accumulating the hydrogen,
a first power generation apparatus generating power using the hydrogen accumulated in the first hydrogen accumulation apparatus, and a storage battery capable of charging and discharging power; and
controlling circuitry configured to determine, on a basis of the operation data, a process to be preferentially executed among at least two of processes including:
a process of generating power in the first power generation apparatus,
a process of producing hydrogen in the hydrogen production apparatus,
a process of charging the storage battery,
a process of discharging the storage battery,
a process of transmitting power to the power system and
a process of receiving power from the power system,
wherein the controlling circuitry determines which of the at least two processes is to be executed on a basis of at least one of a first plan and a second plan,
the first plan being a plan regarding an amount of power to be transmitted and received to and from the power system and the second plan being a plan regarding an amount of hydrogen to be accumulated in the first hydrogen accumulation apparatus.

2. The information processing apparatus according to claim 1,
wherein the controlling circuitry determines priorities of the at least two of processes.

3. The information processing apparatus according to claim 2,
wherein the controlling circuitry determines which of the at least two of processes is to be executed on a basis of the operation data and the priorities.

4. The information processing apparatus according to claim 1,
wherein the energy system further comprises a second power generation apparatus capable of generating power using natural energy and supplying the generated power to the power line.

5. The information processing apparatus according to claim 4,
wherein the second power generation apparatus is a solar power generation apparatus.

6. The information processing apparatus according to claim 1,
wherein the energy system further comprises a second hydrogen accumulation apparatus accumulating the hydrogen produced by the hydrogen production apparatus, and a hydrogen supply apparatus supplying the hydrogen accumulated in the second hydrogen accumulation apparatus to an external first apparatus, and
the controlling circuitry determines which process is to be preferentially executed among at least two of processes including:
the process of generating power in the first power generation apparatus,
the process of producing hydrogen to be accumulated in the first hydrogen accumulation apparatus,
a process of producing hydrogen to be accumulated in the second hydrogen accumulation apparatus,
the process of charging the storage battery,
the process of discharging the storage battery,
the process of transmitting power to the power system and
the process of receiving power from the power system.

7. The information processing apparatus according to claim 6,
wherein the controlling circuitry determines which of the at least two processes is to be executed under a constraint condition including a supply plan for supplying the hydrogen to the first apparatus.

8. The information processing apparatus according to claim 1,
wherein the energy system further comprises a water accumulation apparatus accumulating water and a hot water supply apparatus supplying water heated through power generation by the first power generation apparatus to an external second apparatus, and
the controlling circuitry determines which of the at least two processes is to be executed under a constraint condition including a supply plan for supplying the heated water to the second apparatus.

9. The information processing apparatus according to claim 1,
wherein the controlling circuitry determines which of the at least two of processes is to be executed on a basis of supply and demand balance of the power.

10. The information processing apparatus according to claim 1, further comprising:
transmitting circuitry configured to transmit control information to instruct to execute the determined process to the energy system.

11. An information processing method comprising:
receiving operation data of an energy system,
the energy system being capable of inputting and outputting power to and from a power line to which a power system and a load are connected, and
the energy system including
a hydrogen production apparatus producing hydrogen,
a first hydrogen accumulation apparatus accumulating the hydrogen,
a first power generation apparatus generating power using the hydrogen accumulated in the first hydrogen accumulation apparatus, and
a storage battery capable of charging and discharging power; and
determining, on a basis of the operation data, a process to be preferentially executed among at least two of processes including:
a process of generating power in the first power generation apparatus,
a process of producing hydrogen in the hydrogen production apparatus,
a process of charging the storage battery,
a process of discharging the storage battery,
a process of transmitting power to the power system and
a process of receiving power from the power system,
determining which of the at least two processes is to be executed on a basis of at least one of a first plan and a second plan,
the first plan being a plan regarding an amount of power to be transmitted and received to and from the power system and
the second plan being a plan regarding an amount of hydrogen to be accumulated in the first hydrogen accumulation apparatus.

12. An information processing system comprising:
an energy system capable of inputting and outputting power to and from a power line to which a power system and a load are connected,
the energy system including
a hydrogen production apparatus producing hydrogen,
a first hydrogen accumulation apparatus accumulating the hydrogen,
a first power generation apparatus generating power using the hydrogen accumulated in the first hydrogen accumulation apparatus, and
a storage battery capable of charging and discharging power; and
receiving circuitry configured to receive operation data of the energy system,
controlling circuitry configured to determine, on a basis of the operation data, a process to be preferentially executed among at least two of processes including:
a process of generating power in the first power generation apparatus,
a process of producing hydrogen in the hydrogen production apparatus,
a process of charging the storage battery,
a process of discharging the storage battery,
a process of transmitting power to the power system and
a process of receiving power from the power system, wherein the controlling circuitry determines which of the at least two processes is to be executed on a basis of at least one of a first plan and a second plan, the first plan being a plan regarding an amount of power to be transmitted and received to and from the power system and the second plan being a plan regarding an amount of hydrogen to be accumulated in the first hydrogen accumulation apparatus.

13. A non-transitory computer readable medium having a computer program stored therein which when executed by a computer, causes the computer to perform processing comprising:

receiving operation data of an energy system,
the energy system being capable of inputting and outputting power to and from a power line to which a power system and a load are connected, and
the energy system including
a hydrogen production apparatus producing hydrogen,
a first hydrogen accumulation apparatus accumulating the hydrogen,
a first power generation apparatus generating power using the hydrogen accumulated in the first hydrogen accumulation apparatus, and
a storage battery capable of charging and discharging power; and determining, on a basis of the operation data, a process to be preferentially executed among at least two of processes including:
a process of generating power in the first power generation apparatus,
a process of producing hydrogen in the hydrogen production apparatus,
a process of charging the storage battery,
a process of discharging the storage battery,
a process of transmitting power to the power system and
a process of receiving power from the power system, determining which of the at least two processes is to be executed on a basis of at least one of a first plan and a second plan,
the first plan being a plan regarding an amount of power to be transmitted and received to and from the power system and
the second plan being a plan regarding an amount of hydrogen to be accumulated in the first hydrogen accumulation apparatus.

* * * * *